United States Patent
Nadal et al.

(10) Patent No.: US 11,070,415 B2
(45) Date of Patent: Jul. 20, 2021

(54) OVERLAP-SAVE FBMC RECEIVER

(71) Applicant: INSTITUT MINES TELECOM—IMT ATLANTIQUE—BRETAGNE—PAYS DE LA LOIRE, Brest (FR)

(72) Inventors: Jérémy Nadal, Brest (FR); Charbel Abdel Nour, Brest (FR); Amer Baghdadi, Brest (FR)

(73) Assignee: INSTITUT MINES TELECOM-IMT ATLANTIQUE-BRETAGNE-PAYS DE LA LOIRE, Brest (FR)

( * ) Notice: Subject to any disclaimer, the term of this patent is extended or adjusted under 35 U.S.C. 154(b) by 0 days.

(21) Appl. No.: 16/754,741

(22) PCT Filed: Oct. 11, 2018

(86) PCT No.: PCT/EP2018/077769
§ 371 (c)(1),
(2) Date: Apr. 8, 2020

(87) PCT Pub. No.: WO2019/072983
PCT Pub. Date: Apr. 18, 2019

(65) Prior Publication Data
US 2020/0322196 A1 Oct. 8, 2020

(30) Foreign Application Priority Data
Oct. 13, 2017 (EP) ..................................... 17306395

(51) Int. Cl.
H04L 27/26 (2006.01)
H04L 25/02 (2006.01)
H04L 25/03 (2006.01)

(52) U.S. Cl.
CPC .......... *H04L 27/264* (2013.01); *H04L 25/022* (2013.01); *H04L 25/03159* (2013.01); *H04L 27/265* (2013.01); *H04L 27/2698* (2013.01)

(58) Field of Classification Search
CPC ................. H04L 27/264; H04L 25/022; H04L 25/03159; H04L 27/265; H04L 27/2698
See application file for complete search history.

(56) References Cited

U.S. PATENT DOCUMENTS

| | | | | |
|---|---|---|---|---|
| 10,103,922 | B2 * | 10/2018 | Lin | ...................... H04L 27/2649 |
| 2014/0233664 | A1 * | 8/2014 | Abdoli | ................ H04L 27/2628 |
| | | | | 375/261 |

FOREIGN PATENT DOCUMENTS

| | | |
|---|---|---|
| EP | 3 261 310 A1 | 12/2017 |
| WO | WO-2015033052 A1 * | 3/2015 ........... H04L 27/264 |

(Continued)

OTHER PUBLICATIONS

Renfors, et al., "Channel Equalization in Fast-Convolution Filter Bank based Receivers for Professional Mobile Radio", European Wireless 2014, 20th European Wireless Conference, May 14, 2014.

(Continued)

*Primary Examiner* — Sophia Vlahos
(74) *Attorney, Agent, or Firm* — BakerHostetler

(57) ABSTRACT

An FBMC equalization and demodulation unit and corresponding method to process an FBMC signal includes FBMC symbols, each FBMC symbol comprising data mapped over M subcarriers, oversampled by a factor K, filtered by a prototype filter and transposed in the time-domain, comprising: a frequency domain transposition unit, configured to transpose a block of P*KM samples comprising at least one FBMC symbol into frequency domain samples, where P is an integer greater than one, an equalizer unit configured to multiply the frequency domain samples by one or more coefficients computed from a propagation (Continued)

channel estimate, at least one circular convolution unit, configured to perform P circular convolutions between subsets of the equalized samples and a frequency domain response of a frequency shifted version of the prototype filter, and adders, to sum corresponding outputs of each of the P circular convolutions.

13 Claims, 14 Drawing Sheets

(56) References Cited

FOREIGN PATENT DOCUMENTS

| | | | |
|---|---|---|---|
| WO | WO-2016050870 A1 * | 4/2016 | ......... H04L 27/2652 |
| WO | WO-2016092323 A1 * | 6/2016 | ......... H04L 27/2647 |

OTHER PUBLICATIONS

Taheri, et al., "Efficient Implementation of Filter Bank Multicarrier Systems Using Circular Fast Convolution", IEEE Access, vol. 5, pp. 2855-2869, Mar. 27, 2017.

Nadal, et al., "Design and Evaluation of a Novel Short Prototype Filter for FBMC/OQAM Modulation", Oct. 25, 2017.

* cited by examiner

OVERLAP-SAVE FBMC RECEIVER

CROSS-REFERENCE TO RELATED APPLICATIONS

This application is a National Stage of International patent application PCT/EP2018/077769, filed on Oct. 11, 2018, which claims priority to foreign European patent application No. EP 17306395.9, filed on Oct. 13, 2017, the disclosures of which are incorporated by reference in their entirety.

FIELD OF THE INVENTION

The present invention generally relates to wireless radio communications, and more specifically aims at reducing the implementation complexity of an FBMC (acronym for Filter Bank Modulation Carrier) receiver.

BACKGROUND PRIOR ART

Forthcoming mobile communication systems are foreseen to provide ubiquitous connectivity and seamless service delivery in all circumstances. The large number of devices and the coexistence of human-centric and machine type applications expected will lead to a large diversity of communication scenarios and characteristics. In this context, many advanced communication techniques are under investigation.

Among those techniques, one is based on filter-bank multicarrier communications (FBMC) principles. FBMC transmission techniques are based on the well known Orthogonal Frequency-Division Multiplexing transmission techniques (OFDM), where the modulated symbols are mapped over different subcarriers, and transposed in the time domain by an inverse Fast Fourier Transform (IFFT) to be transmitted, but includes an additional step of filtering before transmitting.

In OFDM, a cyclic prefix is inserted to guarantee the signal cyclo-stationarity, which is required so that, on the receiver side, an equalizer can be implemented to remove inter-symbol interferences due to multipath reflections in the propagation environment. In FBMC, the robustness against multipath reflections is provided by first oversampling the symbols to transmit by a factor K, and then filtering the oversampled symbols by a filter called the prototype filter. The oversampled and filtered symbols are known as FBMC symbols. The choice of the prototype filter and oversampling factor is crucial since it has a direct impact over the latency, spectral shape, performances and implementation complexity of the FBMC transmissions. So that the throughput is not reduced due to the oversampling, subsequent FBMC symbols are not transmitted one after the other, but are summed after being delayed by one symbol (overlapping). There is therefore no cyclo-stationarity of the FBMC signal, but the oversampling and filtering provide robustness to inter-symbol interferences due to multipath reflections. The signal is transposed in the time domain by an IFFT which may be of size M if the transposition is made prior to the oversampling and filtering, or of a size KM otherwise, M being the total number of subcarriers allocated for the transmission, comprising useful subcarriers dedicated to the mapping of the data symbols, pilot subcarriers, guard subcarriers, and zero-padded (unused) subcarriers.

FIG. 1 represents the steps of oversampling, filtering and overlapping the symbols in an FBMC transmission. In FIG. 1, symbol #1 101, of M samples, is oversampled K times (102, 103 and 104), which consists in repeating K times all the samples of symbol #1, with K=4 in the example. FBMC symbol #1 is therefore of a size KM. The same operation is performed for symbols #2, #3, and #4. The FBMC symbols #1, #2, #3 and #4 are two by two delayed by M samples, filtered by prototype filter 110 of length KM, and summed.

Compared to OFDM, FBMC presents lower out-of-band power leakages, as there are no sudden transitions between FBMC symbols, due to the filtering by the prototype filter. FBMC transmissions are also less sensitive than OFDM to multipath reflections, as filtered FBMC symbols are generally longer than OFDM symbols, which eases the signal equalization when the propagation channel is frequency selective, and reduces inter-symbols interferences due to multipath reflections. The throughput of FBMC transmissions is higher as no cyclic prefix is required, and as, for a same bandwidth occupation, the number of guard frequencies can be reduced compared to OFDM, as the filtering results in lower out-of-band power leakage. The drawback of FBMC transmission techniques lies in the absence of complex orthogonality as, at a given time, the signal transmitted is the result of the overlapping of K successive symbols combined with the effect of the filtering. The FBMC modulation generates some inter-symbol and inter-carrier interference that introduces an additional complexity in the receiving process.

In order to cope with the interference issues of FBMC transmissions, and therefore to decrease the receiver's complexity, a modulation scheme named FBMC with Offset-Quadrature Amplitude Modulation (FBMC/OQAM, also known as OFDM/OQAM or staggered modulated multitone—SMT) is known, which brings some orthogonality to the transmission. This scheme is being studied and considered as a key enabler for the future flexible 5G air interface. In what follows, unless otherwise mentioned, the OQAM modulation scheme will be considered. However, the invention shall not be limited to FBMC/OQAM scheme as it will be easily adapted by the one skilled to another modulation, like FBMC with QAM modulation or any other modulation.

According to this modulation scheme, the symbols are not mapped over QAM complex samples, but are mapped over either purely real or purely imaginary samples. Indeed, according to Balian-Low theorem, a communication system can only have two of the three following properties at the same time:
  a complex orthogonality,
  a high robustness to time and/or frequency offsets, and
  a high spectral efficiency.

For instance, OFDM sacrifices the robustness to time/frequency offsets to achieve a high spectral efficiency and to enable complex orthogonality. However, these three properties are desired in modern communication systems. To overcome this issue, the requirement about complex orthogonality can be relaxed by using an OQAM modulation which translates the orthogonality in real domain. Therefore, FBMC/OQAM systems have real orthogonality while preserving the robustness to time and frequency offsets, as well as the high spectral efficiency.

The prototype filter is chosen so that the interferences between adjacent subcarriers also are either purely real or purely imaginary. As only using the real or the imaginary part of the samples, the transmission throughput is reduced by a factor two. To compensate this throughput decrease, FBMC symbols are transmitted by pairs of FBMC/OQAM symbol, the first symbol using the real part of the QAM samples (odd transmission channel), and the second one the imaginary part of the same QAM samples (even transmission channel) after being delayed by half the symbol duration, equals to M/2 samples (OQAM mapping).

FIG. 2a represents the symbols ordering in the time domain considered by the OQAM modulation. FBMC/OQAM symbol #1 and FBMC/OQAM symbol #2 are respectively transmitted over the samples corresponding to the real and imaginary transmission channel, FBMC/OQAM symbol #2 being delayed by M/2 with respect to FBMC/OQAM symbol #1.

FIG. 2b represents the symbols' ordering after the FBMC/OQAM modulation. The prototype filter is applied separately over the samples corresponding to the odd transmission channel (201) and the samples corresponding to the even transmission channel (202). FBMC/OQAM symbol #1 is mapped over the odd transmission channel, while FBMC/OQAM symbol #2 is delayed by M/2 and mapped over the even transmission channel. Subsequent FBMC/OQAM symbols are transmitted accordingly. The number of FBMC/OQAM overlapping symbols is therefore of 2K.

Various FBMC/OQAM transmitter implementations are known, that provide the same outputs with different complexities. The main processing to be implemented in a receiver consists of a filtering by an analysis filter, an equalization and an OQAM demapping. The analysis filtering comprises both the filtering of the signal by the prototype filter, in the time or frequency domain, and a signal transposition from the time domain to the frequency domain. It is mandatory to isolate the FBMC symbol considered from the contributions of the overlapping FBMC symbols. The equalization is required to compensate the effects introduced by the propagation channel: per sub-carrier attenuation and phase rotation, inter-symbol and inter-carrier interferences. Therefore, it maximizes the signal over noise ratio (SNR).

The implementation cost of an FBMC receiver corresponds mainly to the number of multipliers, and to a lesser extent the number of adders, that are required, which is of a direct impact on the size, cost, and energy consumption of the chip implementing the receiver, and is expected to be low for obvious reasons of sizing, cost, and autonomy of the receiver.

In what follows, the time and frequency synchronization of the receiver and the propagation channel estimate $\hat{H}(k)$ are considered to be already acquired. Indeed, these processes are known to the skilled person and are not the purpose of the patent application. C. Lele, P. Siohan, and R. Legouable, "2 dB Better Than CP-OFDM with OFDM/OQAM for Preamble-Based Channel Estimation," IEEE International Conference on Communications, 2008, ICC'08, May 2008, pp. 1302-1306 describes a channel estimation method that may be intended to calculate the propagation channel characteristics. Other channel estimation methods are described in E. Kofidis and al. "Preamble-based channel estimation in OFDM/OQAM systems: A review", Signal Processing, 2013.

Among the known implementations of an FBMC receiver is the PolyPhase Network (PPN) implementation. FIG. 3a represents an PPN-FBMC/OQAM transmitter implementation, according to the prior art. It comprises an OQAM mapper 310, comprising a QAM mapper 311 generating complex samples from a binary input. The imaginary values are delayed by M/2 with respect to the real values by delay unit 331. The real and imaginary values are output to respective processing channels. Each processing channel comprises in sequence an inverse Fast Fourier Transform 322, 332, of a M size, and a Polyphase Network (PPN) 323, 333, which performs all at once the upsampling of each signal, and the filtering by the prototype filter. The outputs of the two processing channels are then combined by a summer 340.

FIG. 3b represents a PPN-FBMC/OQAM receiver implementation, according to the prior art. The receiver processes in parallel two channels, the second channel being delayed by M/2 by delay unit 370. Each channel is processed separately by, in sequence, a polyphase network unit 371, 381, a Fast Fourier Transform of a size M 372, 382, and an equalizer 373, 383. The real part 374, 384 of the samples that output each channel are then processed by an OQAM demapper 390.

The drawback of the PPN-FBMC/OQAM receiver lies in the fact that equalization is performed after the filtering. Indeed, in doing so, the propagation channel impulse response and the prototype filter impulse response convolute together, which makes the equalization process more complex and less efficient.

To limit the complexity and implementation cost of the receiver, it is therefore required that the equalization process is made prior to the filtering. This is what is done in another known implementation, called the Frequency Spread (FS) implementation, described in M. Bellanger, "FS-FBMC: an alternative scheme for filter bank based multicarrier transmission", Proceedings of the 5$^{th}$ International Symposium on Communications, Control and Signal Processing, ISCCSP 2012, Rome, Italy, 2-4 May 2012. FIG. 4a represents an FS FBMC/OQAM transmitter implementation according to the prior art. The implementation of FIG. 4a comprises an OQAM mapper 410 comprising a QAM mapper 411 generating complex samples from a binary input. The imaginary values are delayed by M/2 with respect to the real values by delay unit 412. The real and imaginary values are output to respective processing channels. Each processing channel comprises in sequence an upsampling unit 421, 422, which upscales each signal by a factor of K by inserting K−1 zeros between each successive QAM sample, a stage of filtering (through a circular convolution) the up-sampled signal by the frequency response of the prototype filter 431, 432 and an Inverse Fast Fourier Transform block 441, 442. The outputs of the two processing channels are then combined by a summer 443.

On the receiver side, the exact opposite processing is performed. FIG. 4b describes in detail the implementation of a FS-FBMC/OQAM receiver, focusing on the part relative to the equalization 451 and FBMC demodulation 452.

In the FS-FBMC/OQAM receiver implementation of Bellanger, a FFT 460 of size L=KM is performed over the FBMC symbol considered, to transpose the received signal in the frequency domain. With $r_n(l)$ the symbols received over the FBMC symbol #n, the output of the FFT can be expressed as:

$$R_n(k) = \sum_{l=0}^{KM-1} r_n(l) e^{-j\frac{2k\pi l}{KM}}, \quad (1)$$

where k is the subcarrier index. For simplification purposes, since the subsequent processing steps do not depend on the FBMC symbol number, it is dropped to clarify the mathematical description:

$$R(k) = \sum_{l=0}^{KM-1} r(l) e^{-j\frac{2k\pi l}{KM}}. \quad (2)$$

Symbols R(k) are then processed by a linear equalizer, which aims at compensating the impairments introduced by the propagation channel (the environment between the transmitter and receiver antenna). It enables to recover the gain and phase originally transmitted over each subcarrier, and to remove/reduce inter-symbol and inter-carrier interferences. In FIG. 4b, the equalizer takes the form of a single-tap equalizer 470: a coefficient $\hat{C}$ is applied over each subcarrier, $\hat{C}$ being deduced from the estimated channel characteristics, in order to cancel the interferences brought by the propagation channel. Multi-tap equalizers, that process each subcarrier to equalize along with the neighboring subcarriers using a Finite Impulse Response filter (FIR), may equally be considered as they are known to be more efficient against inter-symbol and inter-carrier interferences, but they result in a large increase of the computational load. In what follows, the invention will be described with regard to single-tap equalizers, as they are generally sufficient to provide a good multipath mitigation, but the one skilled in multicarrier equalization techniques can easily adapt the invention to implement a multi-tap equalizer instead of a single-tap.

Coefficients $\hat{C}$ are computed from the channel estimate in the frequency domain $\hat{H}(k)$ using well known techniques, as for instance the zero-forcing (ZF) technique, where the equalizing coefficients are calculated by inverting the channel estimate $$\hat{C}(k) = \frac{1}{\hat{H}(k)},$$

or the Minimum Mean Square Error (MMSE) technique, where the coefficients are determined in order to minimize the square mean of the error introduced by the noise $$\hat{C}(k) = \frac{\hat{H}(k)^*}{\hat{H}(k)\hat{H}(k)^* + 1/\eta},$$

with $\eta$ the SNR and * the conjugate operator. The coefficients may also be computed using any other relevant equalization technique. Channel estimation techniques are not described in more details as they are not an object of the invention and are well known from the one skilled in equalization techniques.

When a single-tap equalizer is applied, the equalized samples X(k) can be expressed as follows:

$$X(k) = \hat{C}(k)R(k) = \hat{C}(k)\sum_{l=0}^{L-1} r(l)e^{-j\frac{2k\pi l}{L}} \quad (3)$$

The equalized frequency domain samples are then filtered by the prototype filter to provide equalized and filtered samples Y(k). This process is performed in the frequency domain, in the form of a circular convolution 480 between the frequency response G(k) of the prototype filter, and the equalized samples:

$$Y(k) = \sum_{l=0}^{L-1} G(l)X(k-l) \quad (4)$$

Samples Y(k) are then down-sampled 490 by a factor K:

$$Y_{DS}(k) = Y(Kk), k \in [0, M-1]. \quad (5)$$

The down-sampled samples are then to be processed by an OQAM demapper.

This FS-FBMC receiver architecture benefits from the robustness against multipath reflections and robustness to timing and carrier-frequency offset (CFO) errors provided by the FBMC modulation and the equalizer. The modulation spectral shape is restrained and the throughput is high. Its implementation cost is limited when the number of samples KM is low.

However, FBMC transmissions might show high latencies when implemented considering a long prototype filter and/or a high oversampling factor. Indeed, the time required to demodulate and decode a symbol directly relates to these parameters, and using long prototype filters results in high transmission latencies. In order to reduce the latencies, as well as the equipments complexity, it is known from the prior art, as for instance from J. Nadal, C. Nour, and A. Baghdadi, "Low-complexity pipelined architecture for FBMC/OQAM transmitter," IEEE Trans. on Circuits and Syst. II: Express Briefs, vol. PP, no. 99, pp. 1-1, 2015, to use short prototype filters. Such short prototype filters are generally associated with oversampling factors of one, sometimes two, contrary to standard (long) prototype filters, which are associated to oversampling factors equal or greater than four. Implementing such short prototype filters is of a specific interest as the transmission latency is directly impacted by the filter's length, as well as the transceivers complexity.

It is known to design short prototype filters that preserve the properties of good spectral shape and robustness against CFO of the FBMC modulation. However, the intrinsic robustness to multipath reflections decreases along with the length of the prototype filter, in particular when the multipath reflections show high delay spreads, which is an additional justification if required for using an equalizer at the receiver side. In the absence of cyclic prefix (contrary to OFDM modulation), these multipath reflections introduce cyclo-stationarity issues between the FBMC symbols processed, which are minor when the prototype filter length is high but may severely impact the performances when considering short prototype filters.

To cope with the issues encountered when using short prototype filters, it is known to combine FBMC receivers with a time-domain equalizer based on fast-convolution algorithm, implemented using a known technique called the overlap-save method.

The overlap-save algorithm is an efficient way to evaluate the discrete convolution between a very long signal and a finite impulse response. The principle of this algorithm is to truncate the long signal to convolute in a plurality of short segments that overlap, and to convolute each segment with the finite impulse response in the frequency domain, by first doing a FFT over each segment, multiplying the result of the FFT with the finite impulse response transposed in the frequency domain, and then transpose the result back in the time domain through a IFFT. The symbols that overlap are added. Indeed, as a linear convolution output is always longer than the original sequences, performing the convolution in time domain over successive segments would arise edge-effects, that do not arise when some symbols overlap and are summed.

The overlap-save algorithm naturally suits the use case of an FBMC receiver, as equalization, which can be seen as a convolution between the received signal and the inverse response of the channel estimate, has to be processed over successive FBMC symbols. Thus, the reception of an FBMC symbol is performed by processing a segment of the received signal the size of which is greater than the size of the FBMC symbol. In addition to being an efficient way to correlate the received signal with the inverse of the channel estimate response, the overlap-save method naturally mitigates the cyclo-stationarity issues that originate from the inter-symbol interferences generated by the propagation channel in the absence of cyclic prefix, which are particularly pronounced when using short prototype filters, as all the delayed paths of the FBMC symbol considered are comprised in the block of samples processed. Indeed, as the segment of received signal that is equalized is of a higher length, it comprises both the FBMC symbol, and all contributions of the reflected paths. The equalization process being done over the totality of this segment, it brings all the delayed paths back into the FBMC symbol.

By equalizing a block of input signal which is greater than the size of the symbol considered, and filtering the equalized FBMC symbol, which decreases the power level of the samples situated at the borders of the FBMC symbols, the cyclo-stationarity of the FBMC symbol processed for demodulation is ensured.

The overlap-save technique cannot be applied as such to the FS-FBMC receiver. Indeed, processing a FFT of a size N=PL instead of FFT 460 of a size L raises several problems, among those:
- the filtering must be performed over N subcarriers instead of L, which increases the implementation complexity,
- the subcarrier spacing is not equal to the subcarrier spacing used by the transmitter: an additional stage of down-sampling must be performed, which is not trivial when P is not an integer.

Therefore, to implement an overlap-save technique in an FBMC receiver where the equalization process is performed prior to the filtering process, these two operations must be performed separately. Advantageously, the filtering stage is performed over L samples, so that its complexity does not depend on ratio P. FIG. 5a represents such an FBMC receiver implementation, where the equalization process is performed prior to and independently of the filtering process. The received samples are first equalized 501, to remove inter-symbol interferences due to multiple reflection paths of the propagation environment. When the equalization is performed in the time domain, it may be processed through a convolution between the received signal and an inverted impulse response of the channel. However, it is advantageously performed in the frequency domain using an overlap-save technique, to reduce the implementation cost of the receiver without introducing edge-effects while being compatible with the use of short prototype filters. This equalization process is close to what is done in OFDM receivers. Once equalized, the signal is filtered by the FBMC prototype filter 502. The filtered signal is then transposed to the frequency domain by a FFT 503 of a size KM, and down-sampled 504 by factor K. The filtering and frequency domain transposition can be inverted, in order to perform the filtering in the frequency domain. The resulting symbols are transmitted to a demapper, which is an OQAM demapper 506 for an FBMC/OQAM receiver. For FBMC/OQAM demapping, depending on the symbol considered, only the real part 505 (or imaginary part for even symbols when using OQAM modulation) of the signal is considered.

FIG. 5b illustrates in more detail such an FBMC receiver implementation, where the overlap-save equalization 507 and the filtering and demodulation 508 of the FBMC signals are performed separately, focusing on the equalization and FBMC demodulation aspects of the receiver. A first FFT 510 is performed, not over an FBMC symbol of a size L but over N=PL samples including the FBMC symbol of interest, P being an integer greater than or equal to 1. The signal in the frequency domain is equalized by coefficients Ĉ (520) and switched back in the time domain by IFFT 530 of size N. The equalized samples in the time domain x(m) can be expressed as:

$$x(m) = \sum_{k=0}^{L-1} \left( \hat{C}(k) \sum_{l=0}^{L-1} r(l) e^{-j\frac{2k\pi l}{L}} \right) e^{j\frac{2k\pi m}{L}}. \tag{6}$$

At the output of IFFT 530, inter-symbol interferences are considered as removed by the equalization process, and only L samples matching the position of the initial FBMC symbol considered are kept, the other samples being discarded (531) as useless. The remaining time-domain equalized samples have to be demodulated by the FBMC demodulator 508 to recover the data transmitted. For this purpose, the samples are processed in sequence by three stages:
- a windowing stage 540, performed on the time-domain equalized samples, by the impulse response of the prototype filter coefficients g. This operation consists in multiplying each sample by the corresponding coefficient of the prototype filter. It realizes a per-subcarrier filtering of the equalized signal in the time domain. Equalized and filtered samples y(m) may be expressed as:

$$y(k)=g(m)x(m),k\in[0,L-1] \tag{7}$$

- a frequency domain transposition stage 550, by an FFT of size L=KM, applied to the windowed time-domain samples, to calculate the frequency domain samples Y(k):

$$Y(k) = \sum_{m=0}^{L-1} g(m)x(m)e^{-j\frac{2k\pi m}{L}}, k \in [0, L-1] \tag{8}$$

- a down-sampling operation 560, by a factor K=L/M, which consists in keeping one sample out of K at the output of the FFT, to obtain M frequency-domain samples $Y_{DS}$ in the frequency domain:

$$Y_{DS}(k)=Y(Kk),k\in[0,M-1]. \tag{9}$$

The useful data are then recovered using a QAM demapper for the case of FBMC/QAM or an OQAM demapper for the case of FBMC/OQAM, or any other appropriate demapper.

While such an implementation is compatible with the use of short prototype filters, it is rarely implemented in practice as its implementation cost is high. Indeed, it requires the attendance of three Fourier transforms: one FFT (510) and one IFFT (530) of a N=PL size, and one FFT (550) of a L size.

Finally, another drawback of the FBMC receivers implementations known from the prior art comes from the lack of flexibility of the receiving structure to support prototype filters with various sizes in addition to overlapping factors and coefficients in a multi-user context. Indeed, the PPNs 371, 381 depends on the used prototype filters, and the size of the FFTs 372, 382 for the PPN-FBMC receiver depends on the maximum number of subcarrier which can be allocated (M). Furthermore, the sizes of the FFTs 450 for the FS-FBMC receiver or 550 for the overlap-save FBMC receiver, directly relate to the maximum number of subcarriers which can be allocated (M) multiplied by the oversampling factor (K), which is also the length of an FBMC symbol (KM). Therefore, a specific receiving chain must be associated to each FBMC scheme (prototype filter size and oversampling value), which does not match with the aim of the forthcoming 5G mobile communication systems to provide some flexibility in the communication scenarios by using various modulation schemes. For instance, the oversampling factor can be adapted depending on the propagation channel conditions and the latency requirements. The maximum number of subcarriers M can be reduced to increase the subcarrier spacing, which improves the robustness against the Doppler effects and also reduces the latency. All these considerations are therefore a hindrance to deployment of FBMC techniques for 5G communications, and there is a need for an FBMC receiver implementation which achieves the goal of providing an efficient and low cost implementation compatible with short prototype filters, and that can be used with various FBMC schemes.

SUMMARY OF THE INVENTION

It is therefore an object of the invention to provide improvements over the prior art by describing a high performances FBMC receiver, robust to multipath reflections, that can be implemented with a limited complexity and which is compatible with short prototype filters and various FBMC schemes. To this end, the invention ingeniously combines the frequency domain equalization and the FBMC demodulation into one common processing, taking advantage of the time and frequency localization of the prototype filter, to propose a low complexity adaptable FBMC receiver implementation.

To this effect, the invention discloses an FBMC equalization and demodulation unit, to process an FBMC signal comprising FBMC symbols, each FBMC symbol comprising data mapped over M subcarriers, oversampled by a factor K, filtered by a prototype filter and transposed in the time-domain. Depending on implementation choices, the order in which these operations are performed by a transmitter may differ, without any prejudice to the resulting modulated signal. The FBMC equalization and demodulation unit according to the invention comprises:
- a frequency domain transposition unit, configured to transpose a block of P*KM samples comprising at least one FBMC symbol into frequency domain samples, where P is an integer greater than one,
- an equalizer unit configured to multiply said frequency domain samples by one or more coefficients computed from a propagation channel estimate,
- at least one circular convolution unit, configured to perform P circular convolutions between subsets of said equalized samples and a frequency domain response of a frequency shifted version of the prototype filter, and
- adders, to sum corresponding outputs of each of the P circular convolutions.

According to an embodiment of the invention, the FBMC equalization and demodulation unit further comprises a down-sampling unit configured to down-sample by a factor K the outputs of the adders.

In an embodiment of a FBMC equalization and demodulation unit according to the invention, P is chosen so as the signal processed by the frequency domain transposition unit comprises $N_s$ FBMC symbols, with $N_s$ greater or equal to two, the unit further comprising linear phase rotators configured to perform linear phase rotations over the frequency domain samples prior to their processing by the equalizer unit.

The linear phase rotation applied over the frequency domain samples is equal to $$e^{-j\frac{\pi k n_s}{P}},$$

with k an index of the frequency domain sample, $n_s \in [1, N_s]$ an index of an FBMC symbol in the signal processed by the frequency domain transposition unit.

According to a development of a FBMC equalization and demodulation unit according to the invention, the circular convolution units are numbered from 0 to P−1, circular convolution unit number l taking as inputs one out of P outputs of the equalizer unit, starting from output l.

In a FBMC equalization and demodulation unit according to the invention, $G_l$, the frequency domain response of a frequency shifted version of the prototype filter used in the circular convolution unit number l, is given by formula:

$$G_l(p) = \sum_{m=0}^{L-1} g(m) e^{j\frac{2\pi l m}{PKM}} e^{-j\frac{2\pi m p}{KM}}, \quad (10)$$

with p∈[0, L−1].

Advantageously, the frequency domain transposition unit is configured to perform a Fast Fourier Transform.

Advantageously, the coefficients used by the equalizer unit are computed from a propagation channel estimate using a zero-forcing or a minimum mean-square error technique.

According to an embodiment of a FBMC acquisition and demodulation unit according to the invention, wherein the FBMC signal is transmitted by multiple users, each user being associated to an overlapping factor $K_u$, an oversampling factor $P_u$ and a number of subcarriers $T_u$ with $T_u \leq M$, the equalizer unit is configured to take as input $P_u * K_u T_u$ samples depending on the user considered.

According to another aspect of the invention is provided a receiver comprising a FBMC acquisition and demodulation unit according to any embodiment of the invention.

According to another aspect of the invention is provided a method for equalizing and demodulating an FBMC signal. The FBMC signal comprises FBMC symbols, each FBMC symbol comprising data mapped over M subcarriers, oversampled by a factor K, filtered by a prototype filter, and transposed in the time-domain. The method according to the invention comprises the steps of:
- transposing a block of P*KM samples comprising at least one FBMC symbol into frequency domain samples, where P is an integer greater than one,
- equalizing said frequency domain samples, by multiplying them by one or more coefficients computed from a propagation channel estimate,
- performing P circular convolutions between subsets of said equalized samples and a frequency domain response of a frequency shifted version of the prototype filter, and
- summing corresponding outputs of each of the P circular convolutions.

According to another aspect of the invention is provided a computer program adapted to implement said method for equalizing and demodulating an FBMC signal, and a computer readable medium incorporating the computer program.

BRIEF DESCRIPTION OF THE DRAWINGS

The invention will be better understood and its various features and advantages will emerge from the following description of a number of exemplary embodiments and its appended figures in which.

The examples disclosed in this specification are only illustrative of some embodiments of the invention.

DETAILED DESCRIPTION OF THE INVENTION

Figure 5A:
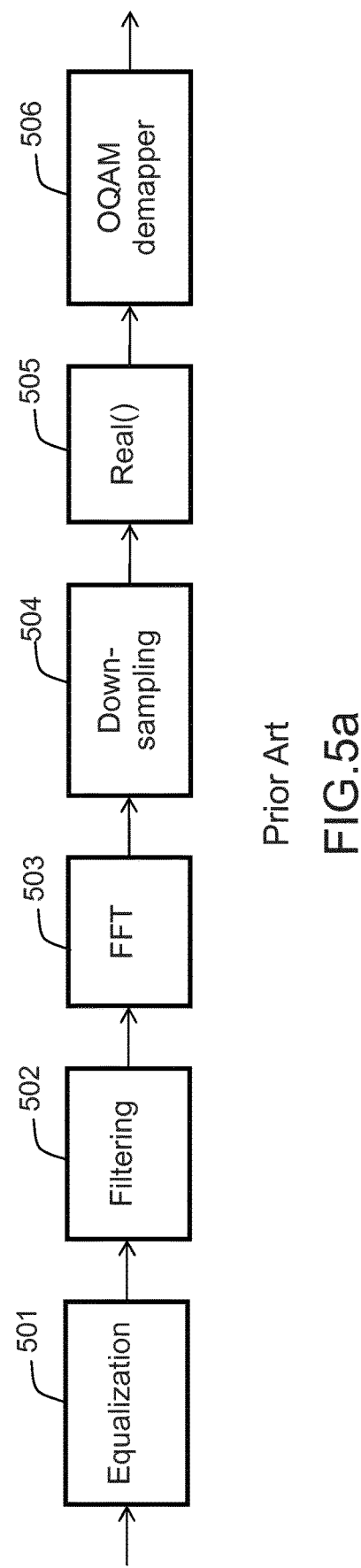
FIG. 5a represents an FBMC receiver implementation, where the equalization process is performed prior and independently to the filtering process, as known from the prior art, represented in more detail in FIG. 5b.
Figure 5B:
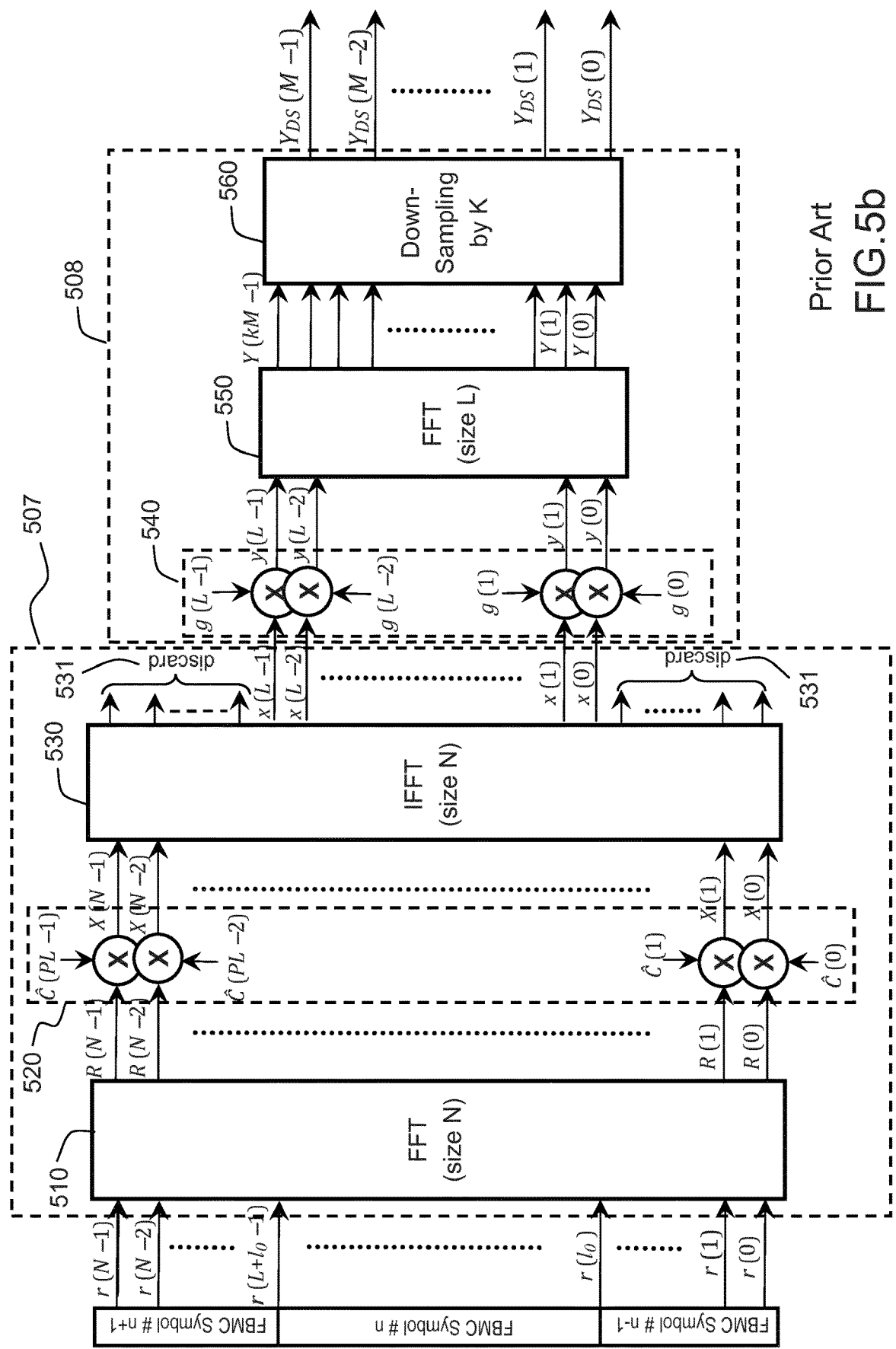

The invention proposes to modify the processing of the overlap-save FBMC receiver of FIG. 5b, which can hardly be implemented in practice, in order to decrease its complexity. Classical implementations of an overlap-save receiver would consider a P ratio which value is in the order of 1.1 to 4 (depending on the delay spread of the propagation channel), the invention proposes to use a P ratio which value is integer. Indeed, while the complexity of the initial FFT shall suffer from this oversized P ratio, it makes possible to operate major simplifications of the successive computations of the receiver.

Indeed, by using a P ratio which is an integer, IFFT 530, of size N=PL, can be decomposed using a Decimation In Time method (DIT) into P IFFT of size L plus one additional stage of applying twiddle factors and summing the outputs of the P IFFTs.

Figure 6A:
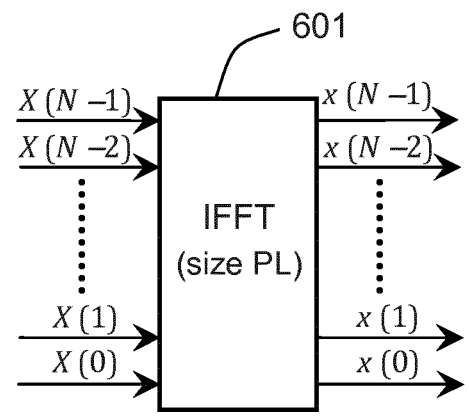
FIGS. 6a and 6b respectively represent an IFFT, and a Decimation In Time decomposition of said IFFT, as known from the prior art.

FIG. 6a represents a standard IFFT, taking as inputs N=PL frequency domain samples X(0) to X(N−1), transposing these samples to time domain samples x(0) to x(N−1). Output x(m) of the IFFT 601 can be expressed as:

$$x(m) = \sum_{k=0}^{N-1} X(k) e^{j\frac{2\pi km}{N}}, \qquad (11)$$

k and m respectively being the indexes of the input and output of the transform.

Figure 6B:
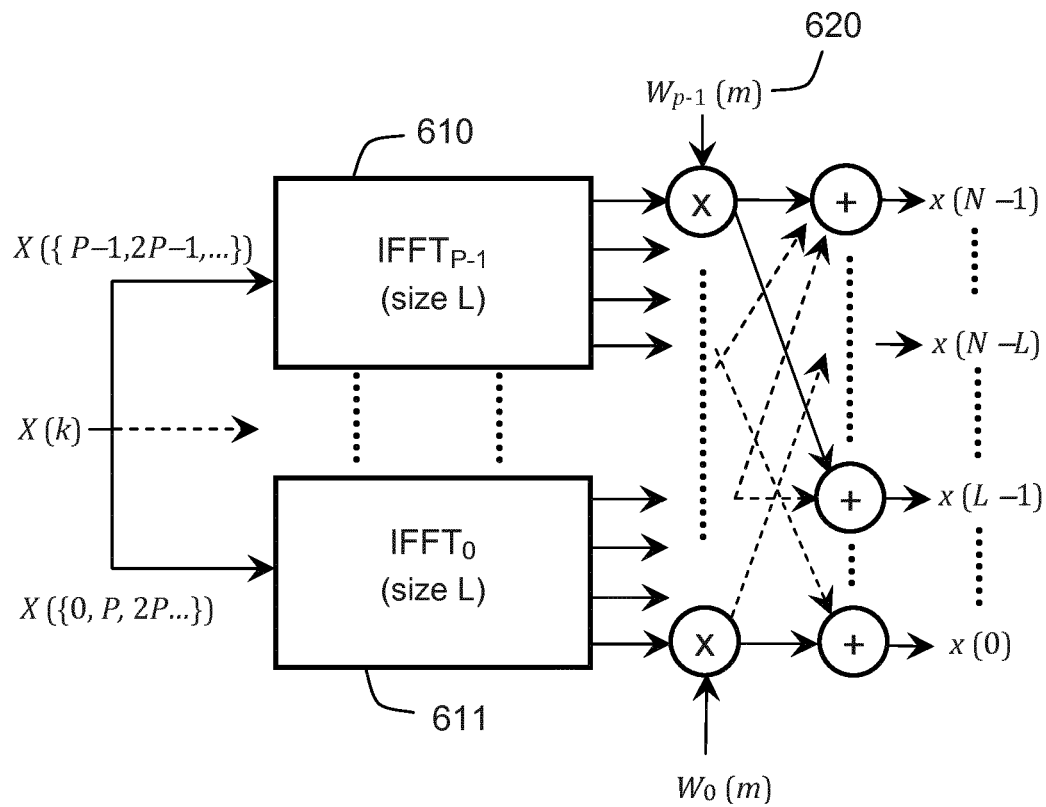

FIG. 6b represents the IFFT 601 of FIG. 6a, considering now a Decimation In Time decomposition. The IFFT 601, of a size PL, can be decomposed into P IFFTs 610, 611, of a size L=N/P. The IFFTs are numbered from 0 to P−1, IFFT number l takes as inputs the samples X(l) to X(l+(L−1)·P−1) with a step P, and l∈[0; P−1]. Twiddle factors $W_l(m)$ 620, that depends on the index of the calculated output x(m), are applied to the appropriate outputs of the IFFTs, and the results are summed. Output x(m) can be expressed as:

$$x(m) = \sum_{l=0}^{P-1}\left(\sum_{k=0}^{L-1} X(Pk+l) e^{j\frac{2\pi Pkm}{N}}\right) e^{j\frac{2\pi lm}{N}}, \text{ and} \qquad (12)$$

$$W_l(m) = e^{j\frac{2\pi lm}{N}}.$$

Applying the Decimation In Time decomposition to FFT 530 of FIG. 5b, samples x(0) to x(L−1), that are to be processed by the filtering stage, can be expressed as:

$$x(m) = \sum_{l=0}^{P-1}\left(\sum_{k=0}^{L-1} X(Pk+l) e^{j\frac{2\pi(Pk+l)(m+l_0)}{N}}\right), \qquad (13)$$

$$m \in [0, L-1] \text{ and}$$

$$x(m) = \sum_{l=0}^{P-1}\left(\sum_{k=0}^{L-1} X(Pk+l) e^{j\frac{2\pi(Pk+l)l_0}{N}} e^{j\frac{2\pi km}{L}}\right) e^{j\frac{2\pi lm}{N}}, \qquad (14)$$

$$m \in [0, L-1]$$

In what follows, the following notations shall be used:

$$x(m, l) = \sum_{k=0}^{L-1} X(Pk+l) e^{j\frac{2\pi(Pk+l)l_0}{N}} e^{j\frac{2\pi km}{L}} \text{ and} \qquad (15)$$

$$X(k, l) = X(Pk+l) e^{j\frac{2\pi(Pk+l)l_0}{N}} \qquad (16)$$

The next stage of the FBMC receiver of FIG. 5b consists in the filtering 540 which corresponds to windowing the samples x(m) by the prototype filter g(m), and the transposition of the output of the filtering to the frequency domain through FFT 550 of a size L.

Considering the previous equations, the outputs Y(k) of FFT 550 can be expressed as:

$$Y(k) = \sum_{l=0}^{P-1}\sum_{m=0}^{L-1} g(m) x(m, l) e^{j\frac{2\pi lm}{N}} e^{-j\frac{2\pi km}{L}}, k \in [0, L-1] \qquad (17)$$

It can therefore be deduced that each output of FFT 550, following the filtering stage 540, can be seen as the sum of P equivalent FBMC filters, wherein each equivalent FBMC filter processes the outputs of a size L IFFT multiplied by a linear phase rotation term $$e^{j\frac{2\pi lm}{N}}.$$

The linear phase rotation term $$e^{j\frac{2\pi lm}{N}}$$

can be seen as a carrier-frequency offset which can be integrated in frequency domain thanks to the time and frequency localization of the prototype filter:

$$Y(k) = \sum_{l=0}^{P-1}\left(\sum_{p\in\Omega} G_l(p)\left(\sum_{m=0}^{L-1} x(m,l)e^{-j\frac{2\pi(k-p)m}{N}}\right)\right), \quad (18)$$

$k \in [0, L-1]$, with:

$$G_l(p) = \sum_{m=0}^{L-1} g(m)e^{j\frac{2\pi lm}{N}}e^{-j\frac{2\pi mp}{L}} \quad (19)$$

and $\Omega$ the set of coefficient indexes where the frequency response of the frequency shifted prototype filter is not null, the coefficient indexes belonging to the interval [0, L−1].

The filtering stage can be computed using a circular convolution operation with the filter coefficients $G_l(p)$. At this point, IFFT 530 is decomposed in P IFFT of size L, which outputs are directly connected to the inputs of P FFT equivalent to the FFT 550, which also are of size L. Thus, all the FFT and IFFT of size L can be removed from the implementation, which results in the equation:

$$Y(k) = \sum_{l=0}^{P-1}\left(\sum_{p\in\Omega} G_l(p)X(k-p,l)\right), k\in[0, L-1], \quad (20)$$

Coefficients $G_l$ may be computed by:
considering the impulse response of the prototype filter,
applying to the impulse response a linear phase rotation of $$e^{j\frac{2\pi lm}{N}},$$

and
applying a Fourier Transform to the rotated impulse response.

Advantageously, thanks to the frequency localization of the prototype filter, these coefficients may be simplified by setting to zero all the coefficients which value is not significant, i.e. which value is below a certain percentage of the highest coefficient, for instance 1%.

Therefore, in the FBMC receiver according to the invention, the processing of FIG. 5b of:
performing an IFFT of a size N,
discarding the useless outputs 531 of IFFT 530,
filtering 540 the remaining outputs of IFFT 530 by filter g(m),
transposing the result of the filtering in the frequency domain using FFT 550, can be replaced by:
P circular convolutions between specific outputs of FFT 510 and vectors $G_l$, which are frequency domain transforms of the prototype filter g(m) to which carrier-shift rotations are applied, and
sums between the outputs of the circular convolutions.

Figure 7A:
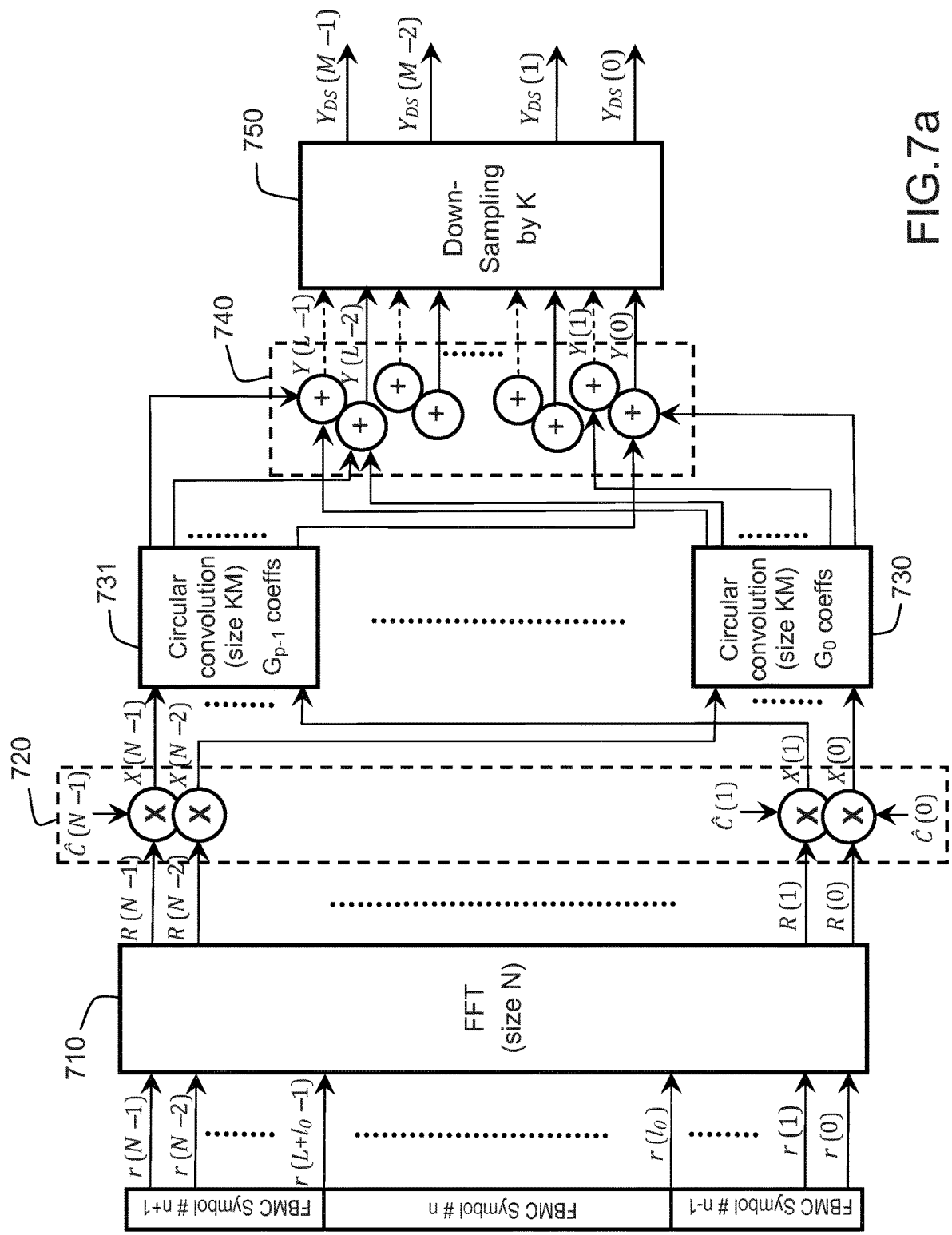
FIGS. 7a and 7b represent two embodiments of an FBMC equalization and demodulation unit according to the invention.

FIG. 7a represents an embodiment of an FBMC equalization and demodulation unit according to the invention.

An initial FFT 710 of a size N=PL, with L the size of an oversampled FBMC symbol and P an integer greater than one, is performed over samples including the FBMC symbol of interest. The aim of the FFT is to convert the received signal into the frequency domain. Using a FFT is advantageous in terms of implementation, but a discrete Fourier Transform would provide the same results. The outputs of FFT 710 are equalized 720, using either a single tap or a multi-taps equalizer. Contrary to FIG. 5b, once equalized, the samples in the frequency domain are not transposed back in the time domain, but are processed by P units (730, 731) performing circular convolutions of a size L.

An index l, l∈[0,P−1], is attributed to each unit performing circular convolution. Unit number l takes as input the outputs number l, l+P, l+2P, . . . , l+(L−1)P, and performs a convolution between said inputs, and vector $G_l$, where $G_l(p)$ is computed from the prototype filter according to the already described equation:

$$G_l(p) = \sum_{m=0}^{L-1} g(m)e^{j\frac{2\pi lm}{N}}e^{-j\frac{2\pi mp}{L}} \quad (21)$$

To calculate sample Y(k), the $k^{th}$ output of each of the circular convolution units are summed (740). Those Y(k) are then down-sampled by a factor K by a final down-sampler 750.

Figure 7B:
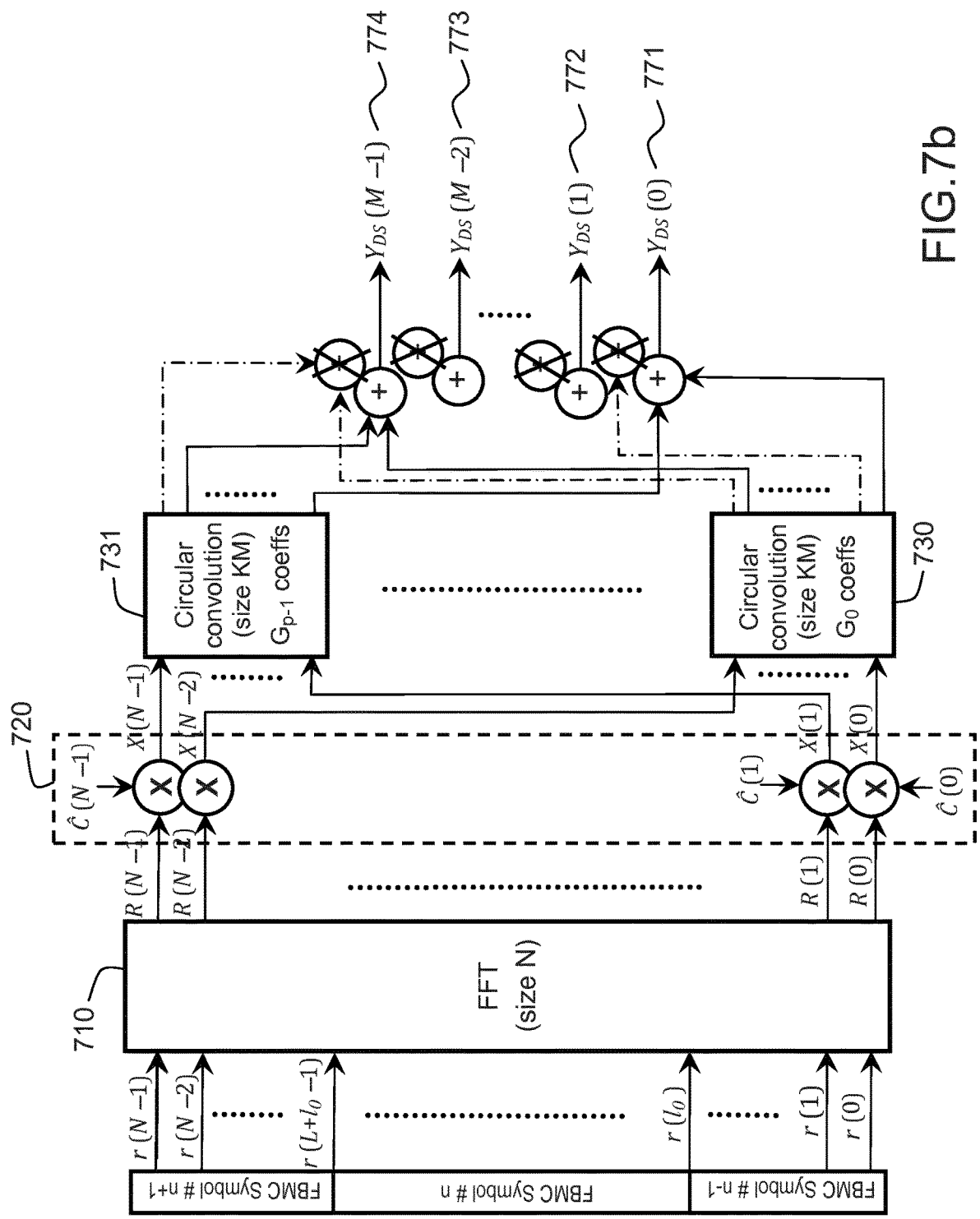

FIG. 7b represents another embodiment of an FBMC equalization and demodulation unit according to the invention, in which the final stage of down-sampling has been removed. Indeed, this stage can easy be suppressed by simply calculating the Y(k) (771, 772, 773, 774) for subcarriers that are to be kept after the down-sampling stage, namely subcarriers k that are a multiple of the overlap factor K.

The FBMC equalization and demodulation unit according to the invention is compatible with any FBMC scheme (QAM, OQAM or any other), and can be implemented for any prototype filter length. As based over an overlap-save technique, it responds to the lack of cyclo-stationarity related to the use of short prototype filters, such filters being mandatory to achieve low latency transmissions.

Figure 4A:
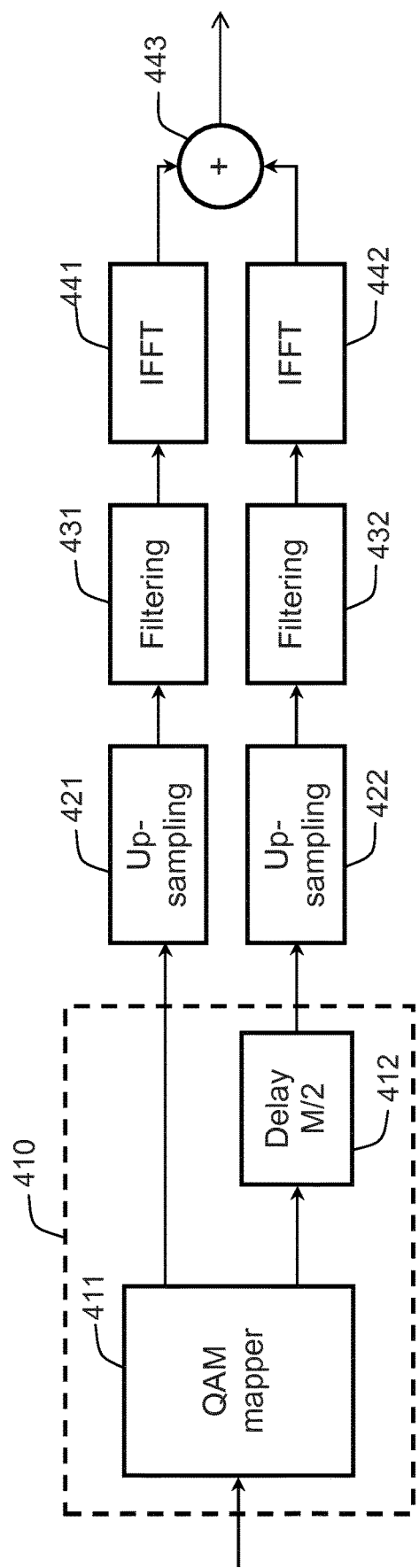
FIG. 4a represents an FS FBMC/OQAM transmitter implementation according to the prior art.
Figure 4B:
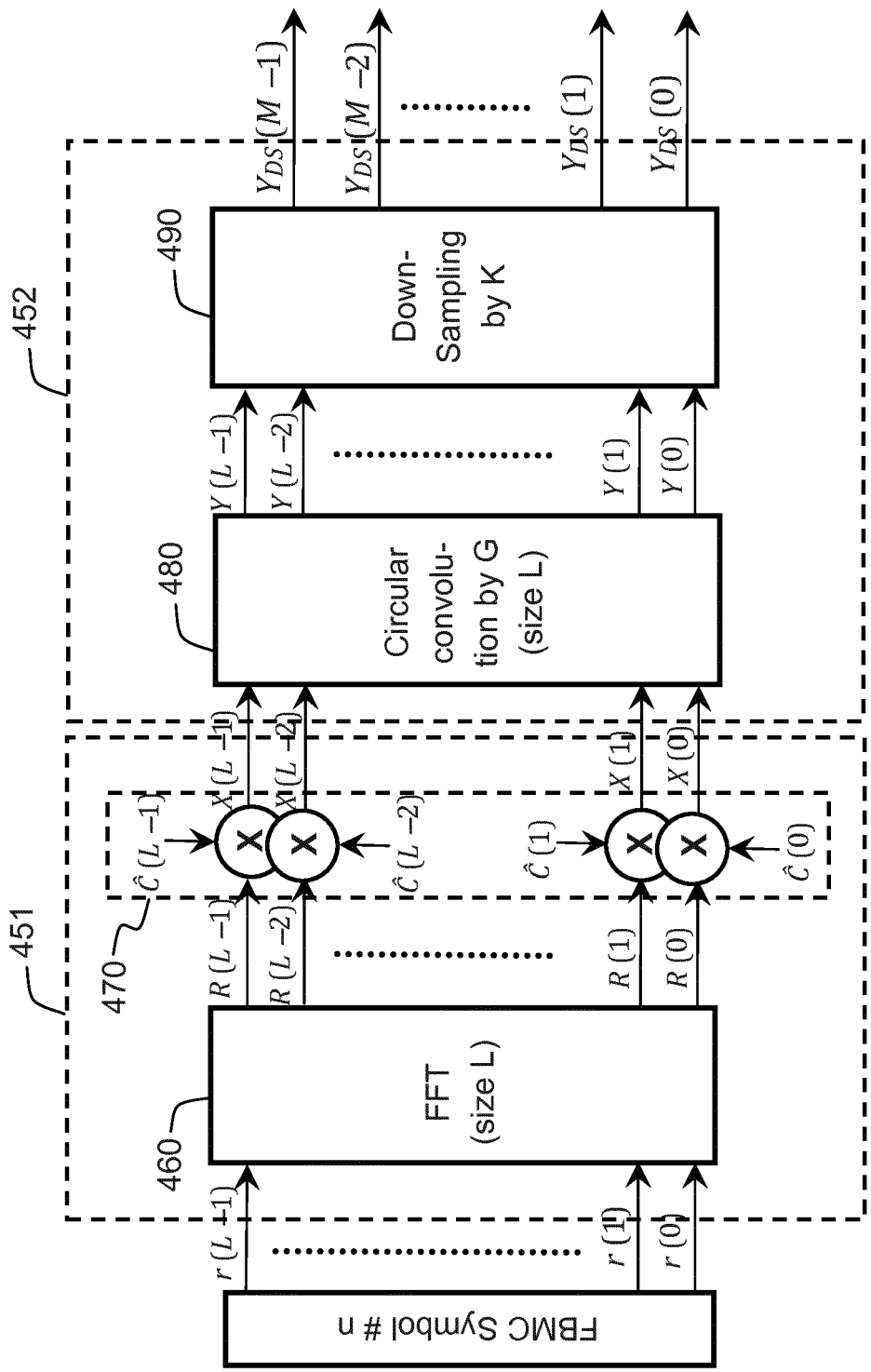
FIG. 4b describes in details the implementation of an FS FBMC receiver according to the prior art, focusing on the part relative to the equalization and FBMC demodulation.

In the prior art implementations, like for instance in the FS-FBMC receiver of FIG. 4b or the overlap-save FBMC receiver of FIG. 5b, FFTs 460 and 550 are specifically of a size L=KM. The implementation is therefore limited to the use of a single type of prototype filter, and multiple FBMC processing chains must be implemented in the receiver chain to handle various prototype filters, each prototype filter being defined by a size L, an overlapping factor K and coefficients $G_l$. In addition, since L=KM, multiple subcarrier spacing (related to M) cannot be supported with prior art implementations. In the FBMC equalization and demodulation unit according to the invention, multiple prototype filters can be supported as long as N is a multiple of L for each prototype filter. Indeed, the architecture of the convolutions performing the filtering only depend on the prototype filter having the highest number of coefficients $G_l$. For prototype filters having a lower number of coefficients, null coefficients are added to comply with this architecture. Furthermore, the number of circular convolution units (P) to perform only depends on the prototype filter size L, since N is fixed, and N=PL. Thus, multiple filter size can be supported by enabling or disabling the processing of circular convolution units, depending on the number of required convolutions to perform the demodulation. In addition, multiple overlapping factors K can be supported by simply adapting the downsampling unit 750. Thus, a same receiver implementation can process multiple FBMC schemes (size of prototype filter, overlapping factor and/or coefficients) as long as N=PL with P an integer. The FBMC receiver according to the invention therefore fits the requirement of adaptability expected from 5G communications.

The FBMC equalization and demodulation unit according to the invention can be implemented over multiple hardware/software architectures.

Among the various possible implementations, the various units required (FFT, circular convolution units, summers) can be embedded over a single calculation machine such as a software reprogrammable calculation machine (microprocessor, microcontroller, digital signal processor (DSP), graphics processing unit (GPU), . . . ), a dedicated calculation machine (Field Programmable Gate Array (FPGA), Application Specific Integrated Circuit (ASIC), . . . ), or any other appropriate equipment.

They can also be implemented by means of computer-application programs or services, as an application-programming interface (API), a library, and/or other computer-program product, or any combination of such entities.

The subject matter of the present disclosure includes all novel and non-obvious combinations and sub-combinations of the various processes, systems and configurations, and other features, functions, acts, and/or properties disclosed herein, as well as any and all equivalents thereof.

The FBMC equalization and demodulation unit according to the invention may be embedded in a receiver, receiving the signal from an antenna and a RF chain in charge of converting the signal to an intermediate frequency or to baseband, and delivering equalized and demodulated data to a unit in charge of computing the subsequent algorithms required to receive the data transmitted, as for instance a QAM or OQAM demodulator, an error code decoder, and/or the functions of the OSI layers that are above the PHY layer. It may also be embedded in a standalone device configured to take as input an intermediate frequency or baseband signal, and to provide equalized and demodulated data to another reception device.

Compared to the implementation of FIG. 5b, the FBMC equalization and demodulation unit implementation according to the invention saves one IFFT 530 of a size N=PL, one FFT 550 of a size L, and one filter 540 of a length L, at the expense of P circular convolution units 730, 731, and L adders 740.

The receiver according to the invention can be implemented by parallelizing the circular convolutions, to optimize the performances, or using in sequence a single circular convolution unit, to optimize the implementation cost. In addition, when the scheme considered is an FBMC/OQAM scheme, only the real (or imaginary) part of the signal is processed at the output of the circular convolutions. Since the filter's coefficients are constants, the multiplications can be implemented by way of adders only, which further reduces the implementation complexity.

Vectors $G_l$, used by the circular convolutions, do not have to be calculated for each iteration, and can be a set of parameters associated to a specific FBMC scheme stored in a memory that can be accessed by the circular convolution units.

Figure 8:
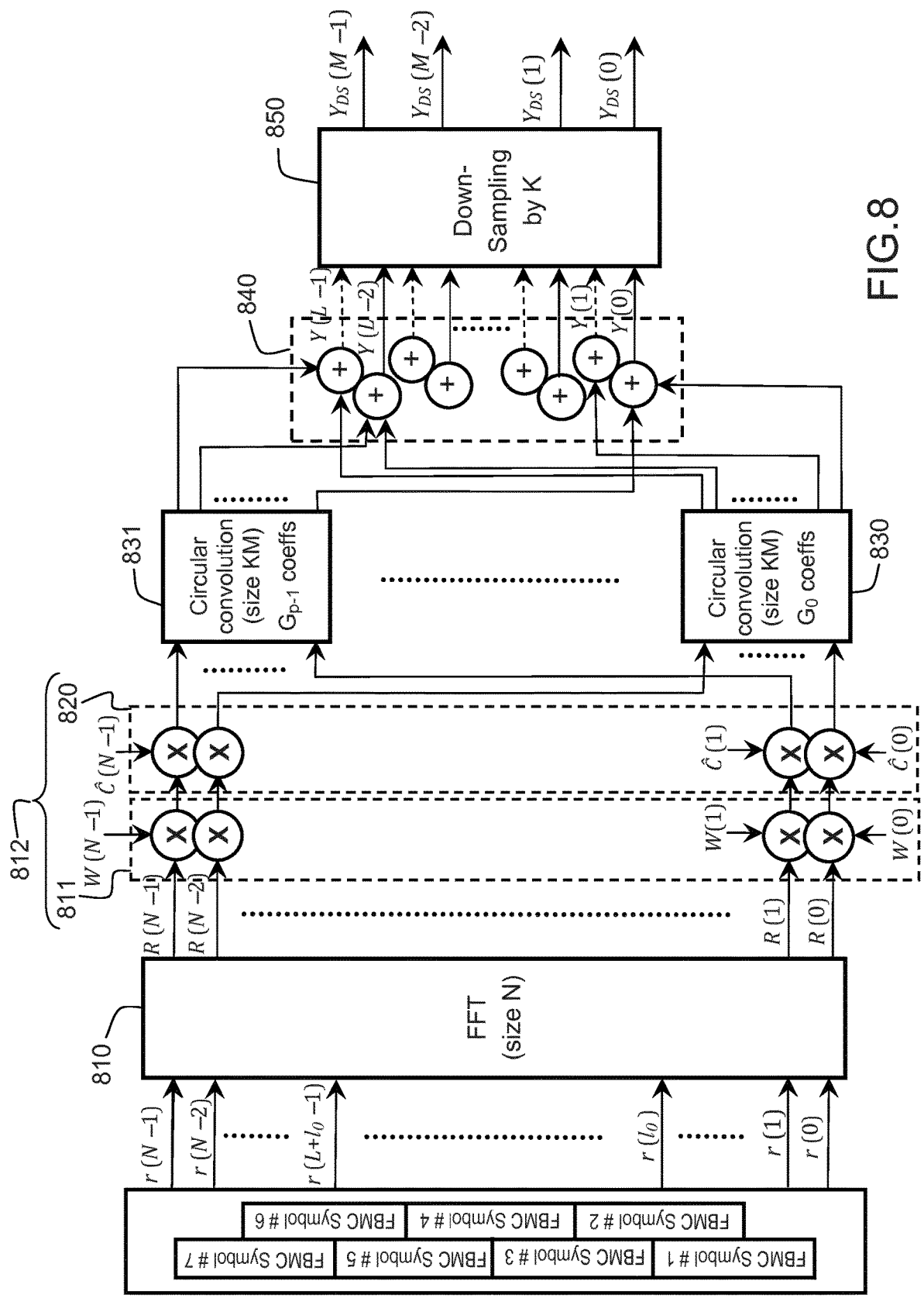
FIG. 8 represents another embodiment of an FBMC equalization and demodulation unit according to the invention, to simultaneously process an entire frame.

FIG. 8 represents another embodiment of an FBMC equalization and demodulation unit according to the invention, in which the initial FFT 810 is performed over a block comprising multiple FBMC symbols. In the example of FIG. 8, the symbols are transmitted using an FBMC/OQAM scheme, so that successive FBMC symbols are transmitted over either the real or imaginary part of the QAM samples, and shifted from half an FBMC symbol. In this illustrative example, P is chosen as being higher than or equal to four, so that the block of samples processed by the initial FFT comprises seven FBMC/OQAM symbols, seven symbols being a good compromise between complexity, latency and spectral efficiency. This embodiment may be easily transposed to various FBMC schemes, using QAM or any other data mapping over the subcarriers, other number of symbols considered by the initial FFT, or other block sizes.

In the embodiment of FIG. 8, the equalized and demodulated samples Y(k) are calculated for each of the FBMC symbols comprised in the block considered by FFT 810 of a N=PL size. For this purpose, a linear phase rotation 811 is applied to the frequency domain samples between FFT 810 and the equalization stage 820. This linear phase rotation is a circular time shift applied to the receiver frequency domain samples, and is calculated depending on the symbol considered. The phase rotation to apply to each subcarrier is $$W(k) = e^{-j\frac{2\pi k n_s M}{2N}},$$

which is equal to $$e^{-j\frac{\pi k n_s}{PK}},$$

where $n_s \in [1, N_s]$ is the index of the FBMC symbol in the block of data processed, $N_s$ being the number of FBMC symbols in the block of data processed.

The subsequent stages of the FBMC equalization and demodulation unit are the same as those of FIG. 7a:
- a stage 820 of equalizing the outputs of FFT 810,
- a stage of performing P circular convolutions 830, 831 between outputs of FFT 810 and vectors $G_l$,
- a stage of summing 840 outputs of the P circular convolutions to calculate equalized and demodulated samples Y(k), and
- a stage 850 of down-sampling Y(k) by a factor K.

As illustrated in FIG. 7b, the stage 850 of down sampling can be advantageously suppressed by directly calculating the down-sampled samples $Y_{DS}(k)$ during the stage 840 of summing outputs of the circular convolution units.

Advantageously, the linear phase shift 811 can be applied along with the equalization in a single stage 812 of phase shifting and equalizing. Therefore, the phase shifts applied to output X(k) in this stage are equal to $W(k)\hat{C}(k)$.

This embodiment of an FBMC receiver implementation according to the invention only uses one FFT to demodulate all the FBMC symbols in the transmitted block, reducing thus the computational complexity.

In order to quantify the gain provided by the invention in terms of implementation complexity, some measurements have been done over an FBMC/OQAM scheme with different values of prototype filter lengths M and an overlap factor of K=2. The measurements have been done over a standard FS-FBMC receiver implementing an overlap-save technique as described in FIG. 5a, the embodiment of the invention presented in FIG. 7b, and the embodiment of the invention presented in FIG. 8.

In the first scenario, M=2048:

|  | Number of multipliers required per FBMC symbol | Ratio to FS-FBMC |
| --- | --- | --- |
| FS-FBMC (FIG. 5a) | ~248000 | 1 |
| Embodiment of FIG. 7b | ~97500 | 0.39 |
| Embodiment of FIG. 8 | ~27300 | 0.11 |

In the second scenario, M=512:

|  | Number of multipliers required per FBMC symbol | Ratio to FS-FBMC |
| --- | --- | --- |
| FS-FBMC (FIG. 5a) | ~47500 | 1 |
| Embodiment of FIG. 7b | ~20300 | 0.74 |
| Embodiment of FIG. 8 | ~6241 | 0.13 |

It can be seen from the above measurements that, depending on the embodiment of the invention considered, the implementation cost of the FBMC receiver can be reduced of almost 90% compared to the prior art.

It must also be noticed that, as the FBMC receiver implementation according to the invention complies with various FBMC symbol sizes, it is well suited for multi-user transmissions, where different subcarriers are allocated to different users potentially using different FBMC schemes (number of subcarriers allocated and overlap factor).

In what follows, it is considered that, for each user u, a group of $T_u$ subcarriers is allocated among $M_u$ representing the total number of subcarriers (allocated or not). Generally, $M_u$ is related to the subcarrier spacing $\Delta F_u = M_u/F_s$, where $F_s$ is the sampling frequency, assumed to be the same for all users. Furthermore, an overlap factor $K_u$ is considered for each user u. As a result, they use different prototype filters, each prototype filter having a length equal to $L_u = M_u K_u$ samples, and having a frequency response $G_u$ which corresponds to $\Delta_u$ coefficients. The number of coefficients $\Delta_u$ may be advantageously reduced by considering only the significant coefficients of $G_u$. At the receiver side, there is no interference between users if they transmit data on separate frequencies, thanks to the frequency localization of the prototype filter.

Figure 1:
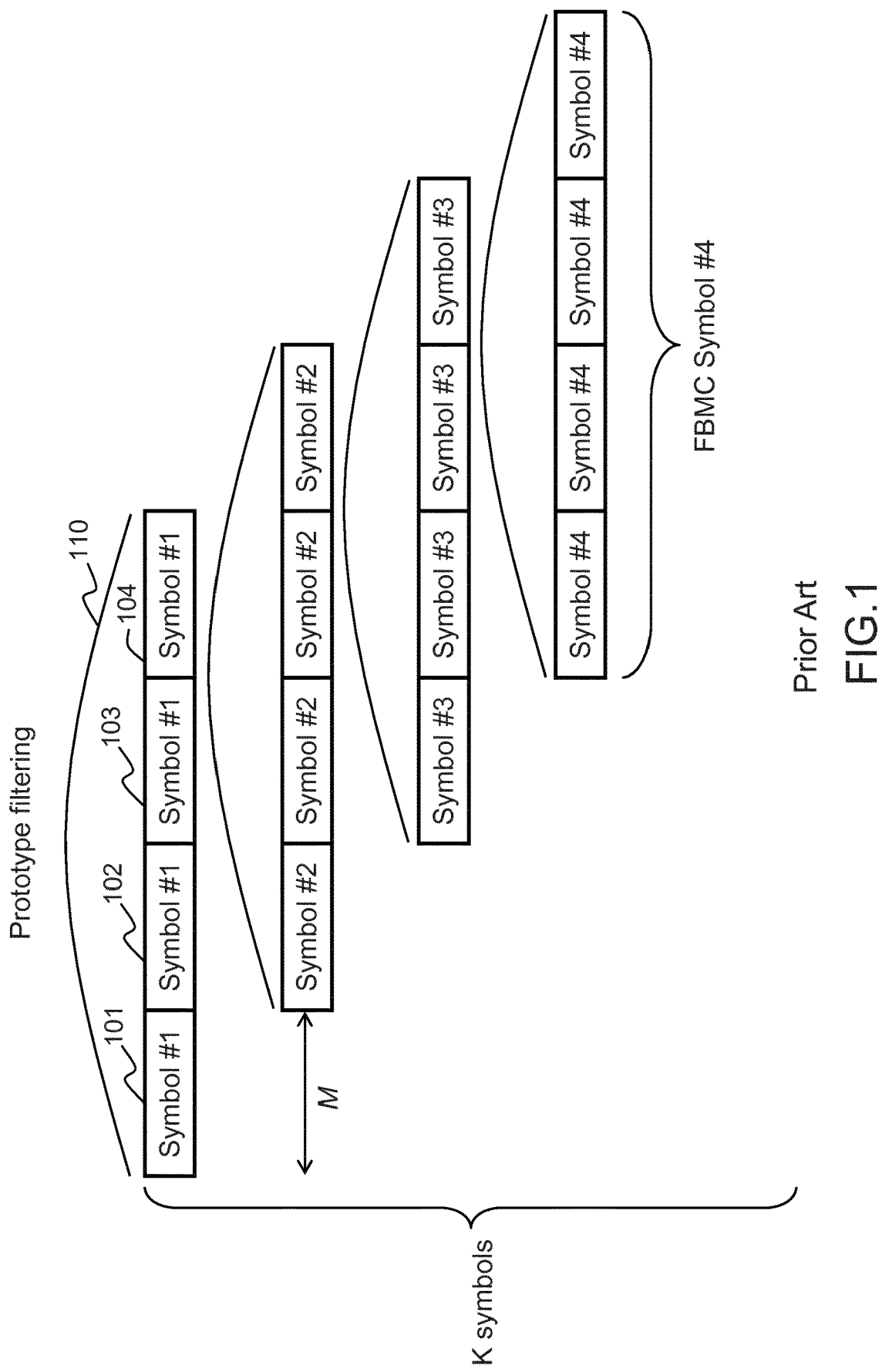
FIG. 1 represents the steps of oversampling, filtering and overlapping the symbols in an FBMC transmission of the prior art.
Figure 2A:
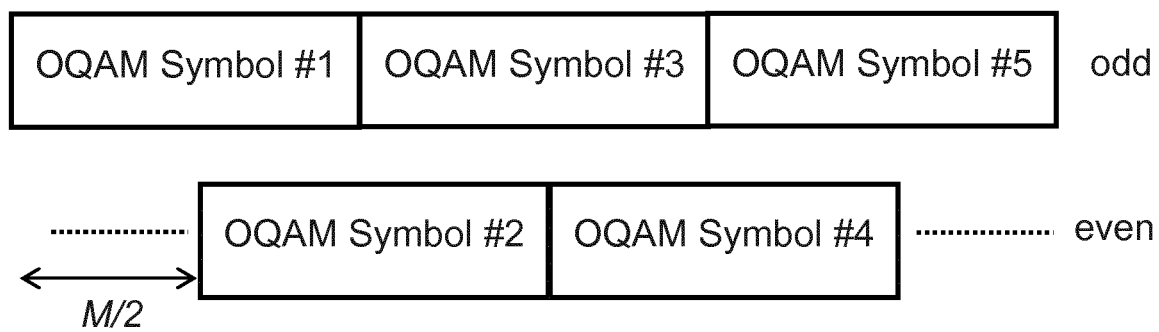
FIGS. 2a and 2b respectively represent the symbols ordering, and steps of oversampling, filtering and overlapping the symbols in an FBMC/OQAM transmission of the prior art.
Figure 2B:
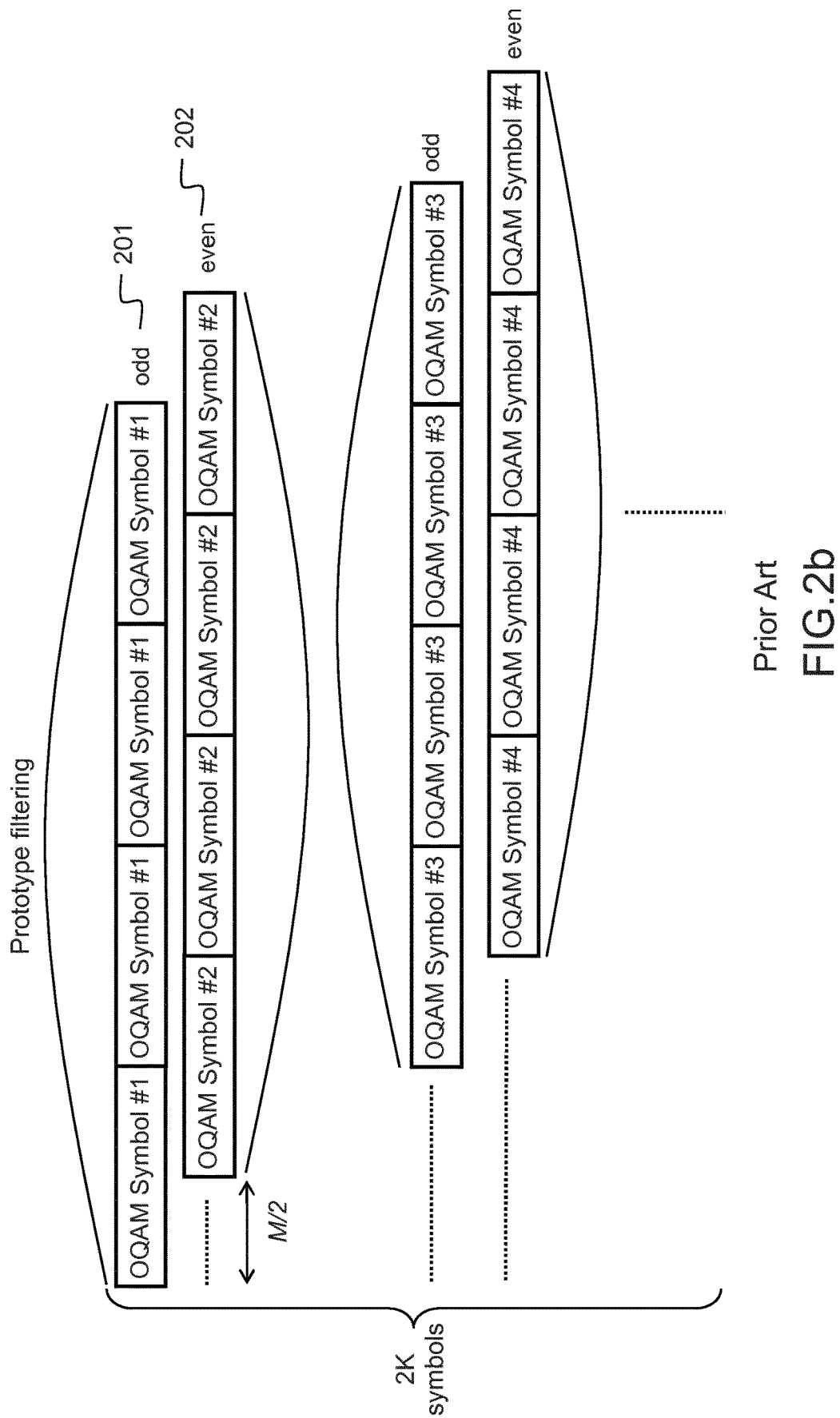
Figure 3A:
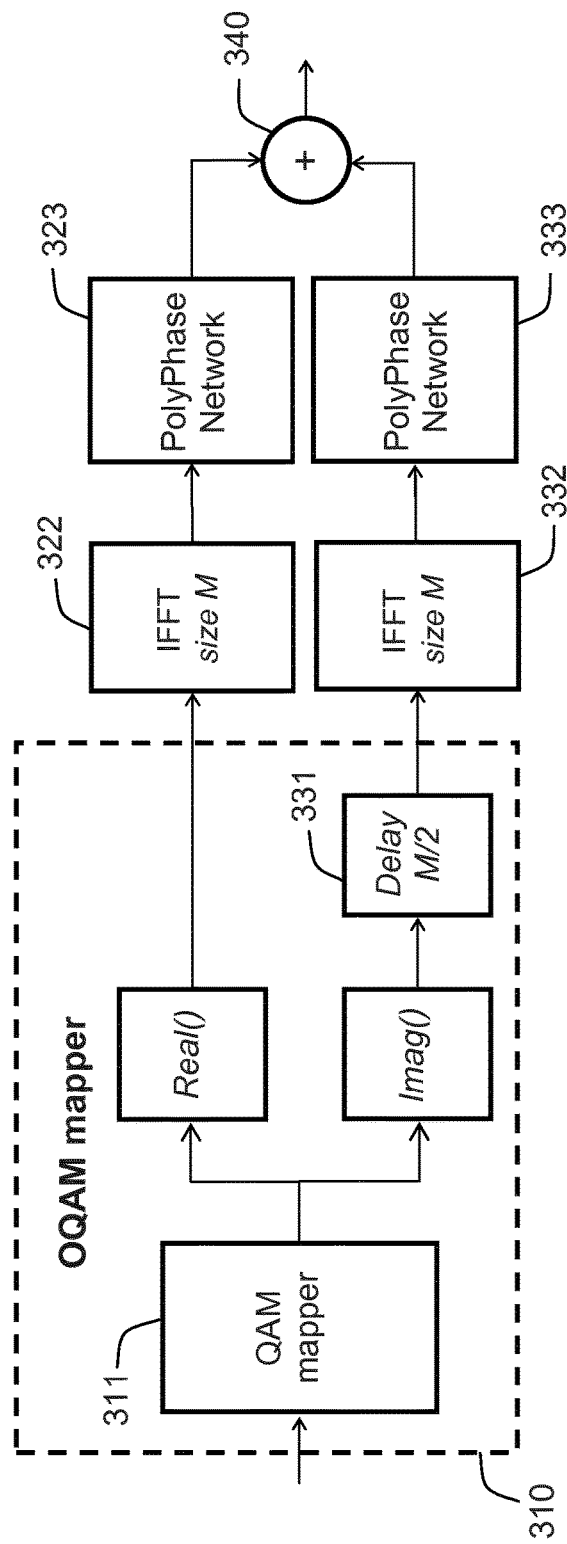
FIGS. 3a and 3b respectively represent a PPN-FBMC/OQAM transmitter and receiver implementation according to the prior art.
Figure 3B:
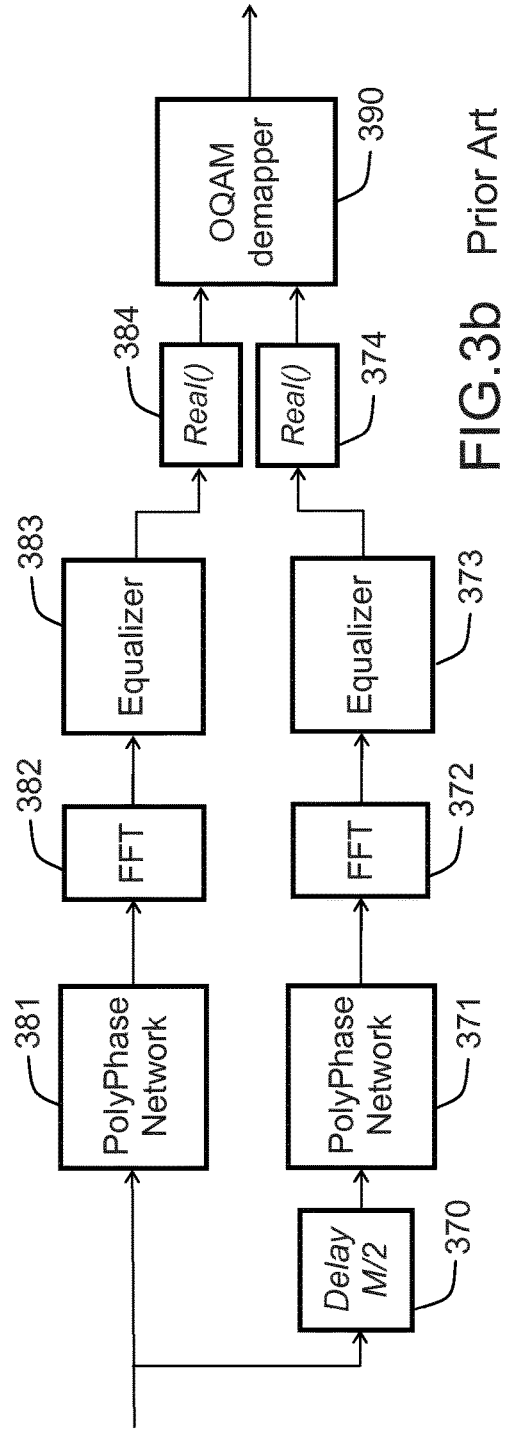

With an FBMC receiver according to the prior art, processing multiple users using different FBMC schemes requires the implementation of one receiver per scheme. Considering for instance the PPN-FBMC receiver of FIG. 3b, the filtering is realized in the time domain, before the FFT. Thus, one implementation per prototype filter is required to process FBMC signals having different schemes. Considering the FS-FBMC receiver of FIG. 4b, the size of the FBMC symbols considered has a direct impact over the size of FFT 460, which must be duplicated for each FBMC scheme. Considering the overlap-save receiver of FIG. 5b, the equalizer part may be common to various FBMC schemes, but the FBMC demodulator part 508 depends on the size of the FBMC symbols.

The invention allows processing each user considering a single receiver implementation, which drastically reduces its implementation cost.

Figure 9:
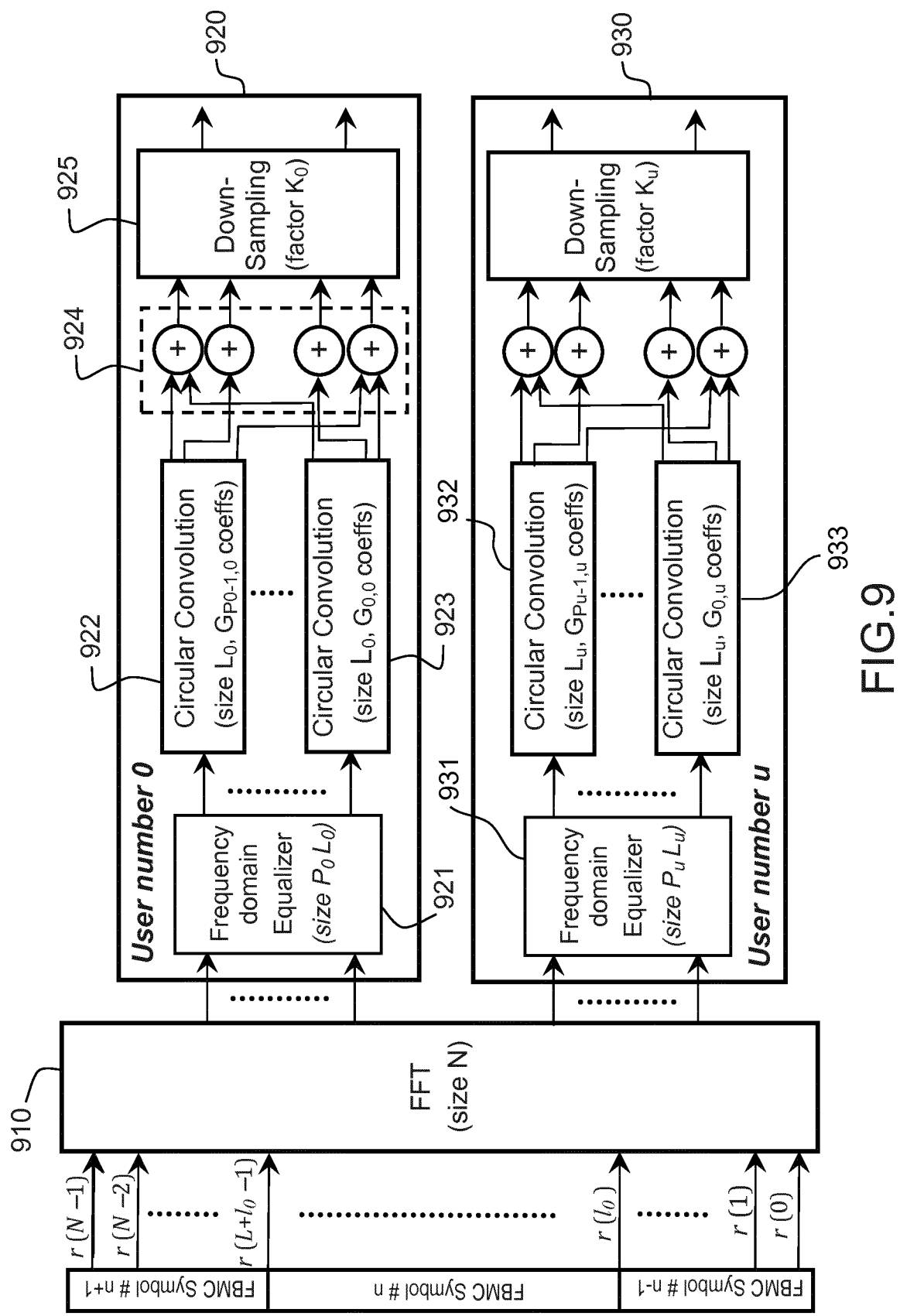
FIG. 9 represents another embodiment of an FBMC equalization and demodulation unit according to the invention, to simultaneously process multiple users.

FIG. 9 represents another embodiment of an FBMC equalization and demodulation unit implementation according to one embodiment of the invention, prone to process signals coming from different users using (or not) various FBMC schemes.

This receiver comprises a first FFT 910, which size N is an integer multiple of all the prototype filters lengths: $\forall u, \mathrm{mod}_{L_u}(N)=0$, which means that, whatever u, there is a $P_u$ that satisfies the formula $N=P_u L_u$.

The FBMC multi-user receiver according to the invention processes each user independently (920, 930), but may use the same FBMC receiver implementation for each FBMC scheme. To this end, the FBMC receiver implementation has to be configured depending on the parameters of each user transmission as follows:

- $P_u$ circular convolutions are to be considered. As seen previously, depending on the embodiment, the $P_u$ circular convolutions can be processed by one circular convolution unit performing in sequence the $P_u$ circular convolutions, by $P_u$ circular convolution units working in parallel, or by a combination thereof;
- the $P_u$ circular convolutions are configured to process the sets of coefficients $G_{l,u}$, with l an index of the circular convolution. The $G_{l,u}$ are computed from the prototype filter, or retrieved from a memory, and are the frequency domain response of a frequency shifted version of the prototype filter;
- the down-sampling factor must be set to $K_u$.

These modifications are different parameters of a same implementation, which comprises, in addition to the FFT 910, a stage of selecting a certain number of subcarriers attributed to the user considered, and the stages of performing a frequency domain equalization over said subcarriers (921), performing $P_u$ circular convolutions over the equalized samples (922, 923), adding the corresponding outputs of the $P_u$ circular convolutions (924), and down-sampling the result by a factor $K_u$ (925). The down-sampling may be avoided by adding only one over $K_u$ outputs of the $P_u$ circular convolutions. The step of selecting a certain number of subcarriers attributed to the user considered is done by selecting the $P_u K_u T_u$ upsampled subcarriers that correspond to the original $T_u$ subcarriers allocated to the user concerned.

The FBMC multi-user receiver according to the invention can be used to demodulate FBMC symbols for all users sharing the lowest total number of subcarriers $M_{min}=\min(M_u)$, referred to as the elementary FBMC symbol. Then, the FBMC symbols having a higher value of $M_u$ can be demodulated each $M_u/M_{min}$ elementary FBMC symbols. It is assumed that $M_u/M_{min}$ are integers, which is generally the case because otherwise, it complicates the frame structure.

Advantageously, when the frame length is the same for each user, the FBMC receiver according to the invention can be combined with the embodiment presented in FIG. 8, in order to process all the FBMC symbols of a frame for each user considering only one FFT 910.

Figure 10:
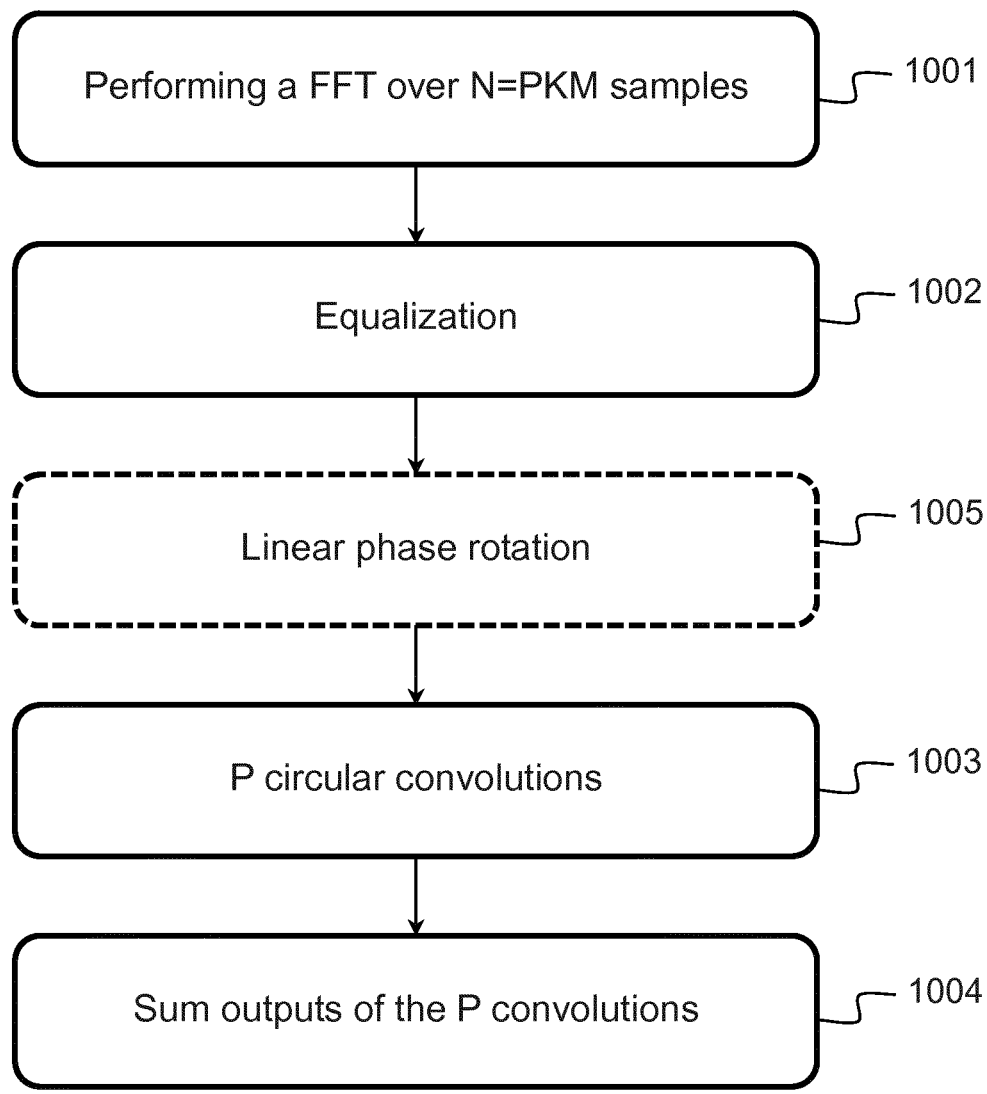
FIG. 10 represents a flow chart of a method FBMC equalization and demodulation method according to an embodiment of the invention.

The invention further addresses a corresponding method, to equalize and demodulate an FBMC signal in a receiver. FIG. 10 represents a flow chart of such a method according to an embodiment of the invention.

The method is to be processed over an FBMC signal, where samples are mapped over M subcarriers. Among the subcarriers, some are dedicated to the mapping of the data symbols, while some others are dedicated to the mapping of pilot sequences, or are left empty (guard subcarriers or unused subcarriers). The M subcarriers are transposed in the time domain, oversampled by a factor K, and filtered by a prototype filter. The method according to the invention shows good performances whatever the size of the prototype filter and the oversampling ratio, and is compliant with various FBMC symbol sizes as long as the size of the initial FFT, performed during the first step of the method, is a multiple of the prototype filter length. Preliminary steps of synchronizing the receiver in time and frequency over the received signal and calculating a propagation channel estimate and the corresponding vector required to equalize the signal, which are not part of the method object of the invention, are required and considered as realized.

The method comprises a first step 1001 of transposing in the frequency domain a block of received signal, said block comprising the FBMC symbol which equalization and demodulation is to be performed. This transposition shall advantageously be realized considering a Fast Fourier transform, for implementation purposes. The size of the block is of N=PKM, where P is an integer greater than one. The method further comprises a step 1002 of equalizing the frequency domain samples by multiplying each frequency domain sample by one or more coefficients computed from a propagation channel estimate. Advantageously, the coefficients may be computed using a zero-forcing or a minimum mean-square error technique.

The method further comprises a step 1003 of performing P circular convolutions between subsets of equalized samples, and a frequency domain response of a frequency shifted version of the prototype filter. Each unit performing circular convolution uses a distinct set of inputs. For instance, circular convolution unit number 1 takes as input one output of the equalizer unit out of P, starting from output 1. Each unit performing circular convolution between a set of equalized samples and a distinct set of coefficients. For instance, circular convolution unit number 1 correlates the equalized samples with the frequency domain response of a frequency shifted version of the prototype filter $G_l$ given by formula:

$$G_l(p) = \sum_{m=0}^{L-1} g(m) e^{j\frac{2\pi lm}{N}} e^{-j\frac{2\pi mp}{L}}, \quad (22)$$

with $p \in [0, L-1]$.

The method also comprises a step 1004 of summing outputs of the P circular convolution units, to compute the equalized and demodulated samples Y (k). Y(k) is obtained by summing the outputs k of the P circular convolutions units. The Y(k) are then down-sampled by a factor K to retrieve down-sampled samples $Y_{DS}(k)$ Advantageously, the samples $Y_{DS}(k)$ may be retrieved by calculating the samples Y(k) only for indexes k that are multiple of K.

In another embodiment of the FBMC equalization and demodulation process according to the invention, an additional step may be added. In this embodiment, the block of samples processed by the frequency transposition unit is selected so as to comprise multiple FBMC symbols. In this embodiment, a single frequency transposition is required to equalize and demodulate all the FBMC symbols comprised in the block of samples processed, which is advantageous in terms of processing power required.

In this embodiment, a step 1005 of applying a linear transposition to the equalized samples is added, previous to the circular convolution processing. The linear transposition applied to equalized sample k is $$e^{-j\frac{\pi k n_s}{PK}},$$

with $n_s \in [1, N_s]$ the index of the FBMC symbol considered in the block of signal processed, and $N_s$ the number of FBMC symbols comprised in the block of signal processed.

The method according to the invention may be used to process multiple users, by considering, for each user, a number of circular convolutions and the parameters of the circular convolutions that depend on the prototype filter.

The method according to the invention may take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

While embodiments of the invention have been illustrated by a description of various examples, and while these embodiments have been described in considerable details, it is not the intent of the applicant to restrict or in any way limit the scope of the appended claims to such details. The invention in its broader aspects is therefore not limited to the specific details, representative methods, and illustrative examples shown and described.

The invention claimed is:

1. A Filter-Bank Multicarrier Communications (FBMC) equalization and demodulation unit, configured to process an FBMC signal comprising FBMC symbols, each FBMC symbol comprising data mapped over M subcarriers, oversampled by a factor K, filtered by a prototype filter and transposed in a time-domain, the FBMC equalization and demodulation unit comprising:
   a frequency domain transposition unit configured to transpose a block of P*KM samples comprising at least one FBMC symbol into frequency domain samples, where P is an integer greater than one,
   an equalizer unit configured to multiply said frequency domain samples by one or more coefficients computed from a propagation channel estimate to provide equalized samples,
   at least one circular convolution unit, configured to perform P circular convolutions between subsets of said equalized samples and a frequency domain response of a frequency shifted version of the prototype filter, and
   adders, to sum corresponding outputs of each of the P circular convolutions.

2. The FBMC equalization and demodulation unit of claim 1, further comprising a down-sampling unit configured to down-sample by a factor K the outputs of the adders.

3. The FBMC equalization and demodulation unit of claim 1, wherein P is chosen so as the signal processed by the frequency domain transposition unit comprises $N_s$ FBMC symbols, with $N_s$ greater or equal to two, the unit further comprising linear phase rotators configured to perform linear phase rotations over the frequency domain samples prior to their processing by the equalizer unit.

4. The FBMC equalization and demodulation unit of claim 3, wherein the linear phase rotation applied over the frequency domain samples is equal to $$e^{-j\frac{\pi k n_s}{P}},$$

with k an index of the frequency domain sample, $n_s \in [1, N_s]$ an index of an FBMC symbol in the signal processed by the frequency domain transposition unit.

5. The FBMC equalization and demodulation unit of claim 1, wherein the P circular convolutions performed by the at least one circular convolution unit are numbered from 0 to P−1, a circular convolution number I among the P circular convolutions taking as inputs one out of P equalized samples of the equalized samples that are outputs from the equalizer unit starting from equalized sample number I, with $I \in [0, P-1]$.

6. The FBMC equalization and demodulation unit of claim 1, wherein $G_l$ is the frequency domain response of a frequency shifted version of the prototype filter used in the circular convolution number l of the P circular convolutions performed by the at least one circular convolution unit, with $l \in [0, P-1]$, and is given by formula:

$$G_l(p) = \sum_{m=0}^{L-1} g(m) e^{j\frac{2\pi l m}{PKM}} e^{-j\frac{2\pi m p}{KM}},$$

with $p \in [0, L-1]$, L=KM, and a function g( ) of coefficients of the prototype filter.

7. The FBMC equalization and demodulation unit of claim 1, wherein the frequency domain transposition unit is configured to perform a Fast Fourier Transform.

8. The FBMC equalization and demodulation unit of claim 1, wherein the coefficients used by the equalizer unit are computed from a propagation channel estimate using a zero-forcing or a minimum mean-square error technique.

9. The FBMC equalization and demodulation unit of claim 1, wherein the FBMC signal is transmitted by multiple users, each user being associated to an overlapping factor $K_u$, an oversampling factor $P_u$ and a number of subcarriers $T_u$ with $T_u \leq M$, the equalizer unit being configured to take as input $P_u * K_u T_u$ samples depending on the user considered.

10. A receiver comprising the Filter-Bank Multicarrier Communications (FBMC) equalization and demodulation unit of claim 1.

11. A method for equalizing and demodulating a Filter-Bank Multicarrier Communications (FBMC) signal, the FBMC signal comprising FBMC symbols, each FBMC symbol comprising data mapped over M subcarriers, oversampled by a factor K, filtered by a prototype filter and transposed in a time-domain, the method comprising the steps of:
  transposing a block of P*KM samples comprising at least one FBMC symbol into frequency domain samples, where P is an integer greater than one, equalizing said frequency domain samples, by multiplying them by one or more coefficients computed from a propagation channel estimate,
  performing P circular convolutions between subsets of said equalized samples and a frequency domain response of a frequency shifted version of the prototype filter, and
  summing corresponding outputs of each of the P circular convolutions.

12. A system for equalizing and demodulating a Filter-Bank Multicarrier Communications (FBMC) signal, the FBMC signal comprising FBMC symbols, each FBMC symbol comprising data mapped over M subcarriers, oversampled by a factor K, filtered by a prototype filter and transposed in a time-domain, the system comprising:
  a processor configured to execute a computer program;
  a non-transitory computer readable medium storing said computer program, accessible by said processor; and
  said computer program comprising:
  code for transposing a block of P*KM samples comprising at least one FBMC symbol into frequency domain samples, where P is an integer greater than one,
  code for equalizing said frequency domain samples, by multiplying them by one or more coefficients computed from a propagation channel estimate,
  code for performing P circular convolutions between subsets of said equalized samples and a frequency domain response of a frequency shifted version of the prototype filter, and
  code for summing corresponding outputs of each of the P circular convolutions.

13. A non-transitory computer readable medium comprising instructions which when executed by a processor cause the processor to perform the steps of claim 11.

* * * * *